United States Patent
Park et al.

(10) Patent No.: US 12,143,222 B2
(45) Date of Patent: Nov. 12, 2024

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Haewook Park, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/094,291

(22) Filed: Jan. 6, 2023

(65) Prior Publication Data
US 2023/0145930 A1  May 11, 2023

Related U.S. Application Data

(63) Continuation of application No. PCT/KR2021/010396, filed on Aug. 6, 2021.

(30) Foreign Application Priority Data

Aug. 6, 2020 (KR) .................. 10-2020-0098739
Nov. 11, 2020 (KR) .................. 10-2020-0150410
Jan. 15, 2021 (KR) .................. 10-2021-0006332

(51) Int. Cl.
*H04L 1/1812* (2023.01)
*H04W 72/1273* (2023.01)
*H04W 72/23* (2023.01)

(52) U.S. Cl.
CPC ....... *H04L 1/1812* (2013.01); *H04W 72/1273* (2013.01); *H04W 72/23* (2023.01)

(58) Field of Classification Search
CPC ... H04L 1/1812; H04L 1/1861; H04L 1/1864; H04L 1/1822; H04L 1/1854;
(Continued)

(56) References Cited

U.S. PATENT DOCUMENTS

2014/0192757 A1   7/2014  Lee et al.
2017/0105203 A1*  4/2017  Seo .................. H04L 5/0048
(Continued)

FOREIGN PATENT DOCUMENTS

KR    1020170125334    11/2017
WO    2012094639        7/2012
(Continued)

OTHER PUBLICATIONS

PCT International Application No. PCT/KR2021/010396, Written Opinion of International Searching Authority and International Search Report dated Nov. 10, 2021, 9 pages.
(Continued)

*Primary Examiner* — Hanh N Nguyen
(74) *Attorney, Agent, or Firm* — LEE, HONG, DEGERMAN, KANG & WAIMEY

(57) ABSTRACT

The present invention relates to a method and a device for same, the method comprising the steps of: receiving control information for disabling at least one among a plurality of hybrid automatic repeat and request (HARQ) processes; receiving a downlink signal on the basis of the control information; and determining whether to perform HARQ feedback for the downlink signal on the basis of a HARQ-acknowledgement (HARQ-ACK) codebook determined on the basis of the control information, wherein the HARQ-ACK codebook is determined on the basis of at least one enabled HARQ process among the plurality of HARQ processes.

7 Claims, 22 Drawing Sheets

(58) Field of Classification Search
CPC .......... H04L 1/1858; H04W 72/1273; H04W 72/23; H04W 84/06
See application file for complete search history.

(56) References Cited

U.S. PATENT DOCUMENTS

| | | | | |
|---|---|---|---|---|
| 2018/0020335 | A1* | 1/2018 | Yin | .................... H04W 28/0268 |
| 2019/0363843 | A1 | 11/2019 | Gordaychik | |
| 2020/0007298 | A1* | 1/2020 | Korhonen | ............. H04L 5/0055 |
| 2020/0146056 | A1 | 5/2020 | Kim et al. | |
| 2020/0396760 | A1* | 12/2020 | Yi | .......................... H04L 1/1864 |
| 2021/0391955 | A1* | 12/2021 | He | .......................... H04L 5/001 |
| 2022/0264614 | A1* | 8/2022 | Yu | .......................... H04L 1/1861 |
| 2022/0271873 | A1* | 8/2022 | Gao | ...................... H04L 1/1854 |
| 2022/0286242 | A1* | 9/2022 | Khan | .................... H04L 1/1893 |
| 2022/0376844 | A1* | 11/2022 | Muruganathan | ...... H04L 1/1896 |

FOREIGN PATENT DOCUMENTS

| | | |
|---|---|---|
| WO | 2017078454 | 5/2017 |
| WO | 2018236117 | 12/2018 |
| WO | 2019160737 | 8/2019 |
| WO | 2020032779 | 2/2020 |
| WO | 2021018051 | 2/2021 |
| WO | 2021064681 | 4/2021 |

OTHER PUBLICATIONS

Korean Intellectual Property Office Application Serial No. 10-2022-7046297, Prior Art Search Report dated Jan. 17, 2023, 7 pages.
Korean Intellectual Property Office Application No. 10-2022-7046297, Office Action dated Sep. 11, 2023, 5 pages.
Panasonic, "HARQ and blind retransmission for NTN", R1-1908819, 3GPP TSG RAN WG1 #98, Aug. 2019, 6 pages.
Sony, "Discussion on delay-tolerant HARQ for NTN", R1-1912349, 3GPP TSG RAN WG1 Meeting #99, Nov. 2019, 6 pages.
European Patent Office Application Serial No. 21852200.1, Search Report dated Jul. 11, 2024, 9 pages.
Japan Patent Office Application No. 2023-507710, Notice of Allowance dated Aug. 20, 2024, 2 pages.
MediaTek Inc., "Summary for more delay-tolerant re-transmission mechanisms in NR-NTN", R1-1907757, 3GPP TSG RAN WG1 Meeting #97, May 2019, 8 pages.
CMCC, "Considerations on HARQ for Non-Terrestrial Networks", R1-1912537, 3GPP TSG RAN WG1 #99, Nov. 2019, 5 pages.
MediaTek Inc., "Summary of 7.2.5.4 on more delay-tolerant re-transmission mechanisms in NR-NTN", R1-1909783, 3GPP TSG RAN WG1 Meeting #98, Aug. 2019, 10 pages.
Thales, "Presentation of Report to TSG-RAN of TR38.821, Version 1.1.0", RP-193062, 3GPP TSG-RAN Meeting #86, Dec. 2019, 1 page.
MediaTek Inc., "Delay-tolerant re-transmission mechanisms in NR-NTN", R1-1909984, 3GPP TSG RAN WG1 Meeting #98bis, Oct. 2019, 6 pages.
Sony, "Discussion on delay-tolerant HARQ for Ntn", R1-1910748, 3GPP TSG RAN WG1 Meeting #98bis, Oct. 2019, 6 pages.

* cited by examiner (a)

(b)

(a)

(b)

- Common TA (Tcom) = 2*D0/c
- UE specific differential TA for xth UE (TUEx) = 2*(D1x-D0)/c
- Full TA (Tfull) = Tcom+TUEx (a) Regenerative payload

- Common TA (Tcom) = 2*(D01+D02)/c
- UE specific differential TA for xth UE (TUEx) = 2*(D1x-D01)/c
- Full TA (Tfull) = Tcom+TUEx (b) Transparent payload

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is a continuation of International Application No. PCT/KR2021/010396, filed on Aug. 6, 2021, which claims the benefit of earlier filing date and right of priority to Korean Patent Application Nos. 10-2020-0098739, filed on Aug. 6, 2020, 10-2020-0150410, filed on Nov. 11, 2020, and 10-2021-0006332, filed on Jan. 15, 2021, the contents of which are hereby incorporated by reference herein in their entireties.

TECHNICAL FIELD

The present disclosure relates to a wireless communication system, and more particularly, to a method and apparatus for transmitting and receiving a wireless signal.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal.

Another object of the present disclosure is to provide an improved hybrid automatic repeat request (HARQ) method for solving a latency problem caused by a relatively large round trip time (RTT) in a non-terrestrial network (NTN) environment and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, there is provided a method performed by a user equipment (UE) in a wireless communication system. The method may include: receiving control information for disabling at least one of a plurality of hybrid automatic repeat request (HARQ) processes; receiving a downlink signal based on the control information; and determining whether to perform HARQ feedback for the downlink signal based on a HARQ acknowledgement (HARQ-ACK) codebook determined based on the control information. The HARQ-ACK codebook may be determined based on one or more enabled HARQ processes among the plurality of HARQ processes.

According to a second aspect of the present disclosure, there is provided a UE configured to operate in a wireless communication system. The UE may include: at least one radio frequency (RF) unit; at least one processor; and at least one computer memory operably coupled to the at least one processor and configured to, when executed, cause the at least one processor to perform operations. The operations may include: receiving control information for disabling at least one of a plurality of HARQ processes; receiving a downlink signal based on the control information; and determining whether to perform HARQ feedback for the downlink signal based on a HARQ-ACK codebook determined based on the control information. The HARQ-ACK codebook may be determined based on one or more enabled HARQ processes among the plurality of HARQ processes.

According to a third aspect of the present disclosure, there is provided an apparatus for a UE. The apparatus may include: at least one processor; and at least one computer memory operably coupled to the at least one processor and configured to, when executed, cause the at least one processor to perform operations. The operations may include: receiving control information for disabling at least one of a plurality of HARQ processes; receiving a downlink signal based on the control information; and determining whether to perform HARQ feedback for the downlink signal based on a HARQ-ACK codebook determined based on the control information. The HARQ-ACK codebook may be determined based on one or more enabled HARQ processes among the plurality of HARQ processes.

According to a fourth aspect of the present disclosure, there is provided a computer-readable storage medium comprising at least one computer program configured to, when executed, cause at least one processor to perform operations. The operations may include: receiving control information for disabling at least one of a plurality of HARQ processes; receiving a downlink signal based on the control information; and determining whether to perform HARQ feedback for the downlink signal based on a HARQ-ACK codebook determined based on the control information. The HARQ-ACK codebook may be determined based on one or more enabled HARQ processes among the plurality of HARQ processes.

According to a fifth aspect of the present disclosure, there is provided a method performed by a base station in a wireless communication system. The method may include: transmitting control information for disabling at least one of a plurality of HARQ processes; transmitting a downlink signal based on the control information; and receiving HARQ feedback for the downlink signal based on a HARQ-ACK codebook determined based on the control information. The HARQ-ACK codebook may be determined based on one or more enabled HARQ processes among the plurality of HARQ processes.

According to a sixth aspect of the present disclosure, there is provided a base station configured to operate in a wireless communication system. The base station may include: at least one RF unit; at least one processor; and at least one computer memory operably coupled to the at least one processor and configured to, when executed, cause the at least one processor to perform operations. The operations may include: transmitting control information for disabling at least one of a plurality of HARQ processes; transmitting a downlink signal based on the control information; and receiving HARQ feedback for the downlink signal based on a HARQ-ACK codebook determined based on the control information. The HARQ-ACK codebook may be determined based on one or more enabled HARQ processes among the plurality of HARQ processes.

According to an embodiment, the one or more enabled HARQ processes may include remaining HARQ processes except for the at least one HARQ process disabled based on the control information among the plurality of HARQ processes.

According to an embodiment, the plurality of HARQ processes may be configured for each of a plurality of cells configured for the UE, and the HARQ-ACK codebook may be determined based on a cell including the one or more enabled HARQ processes.

According to an embodiment, the at least one disabled HARQ process may be excluded from the determination of the HARQ-ACK codebook.

According to an embodiment, the UE may be configured to ignore a counter downlink assignment indicator (C-DAI) value in downlink control information (DCI) indicating the at least one disabled HARQ process.

According to an embodiment, the HARQ-ACK codebook may include a Type 1 HARQ-ACK codebook, a Type 2 HARQ-ACK codebook, or a Type 3 HARQ-ACK codebook.

According to an embodiment, a timing offset for performing the HARQ feedback may be indicated based on a value determined based on a resource index and a value of a specific field value with a fixed size in DCI.

According to an embodiment, the resource index may include a specific index of a slot in which a physical downlink control channel (PDCCH) or a physical downlink shared channel (PDSCH) scheduled by the PDCCH is received, a system frame number (SFN), or an index of a control channel element (CCE) in which the PDCCH is received.

According to an embodiment, the wireless communication system may include a non-terrestrial network (NTN).

According to the present disclosure, a wireless signal may be transmitted and received efficiently in a wireless communication system.

According to the present disclosure, it is possible to solve a latency problem caused by a relatively large round trip delay (RTD) in a non-terrestrial network (NTN) environment.

According to the present disclosure, when hybrid automatic repeat request (HARQ) feedback is disabled, a HARQ acknowledgement (HARQ-ACK) codebook may be configured efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
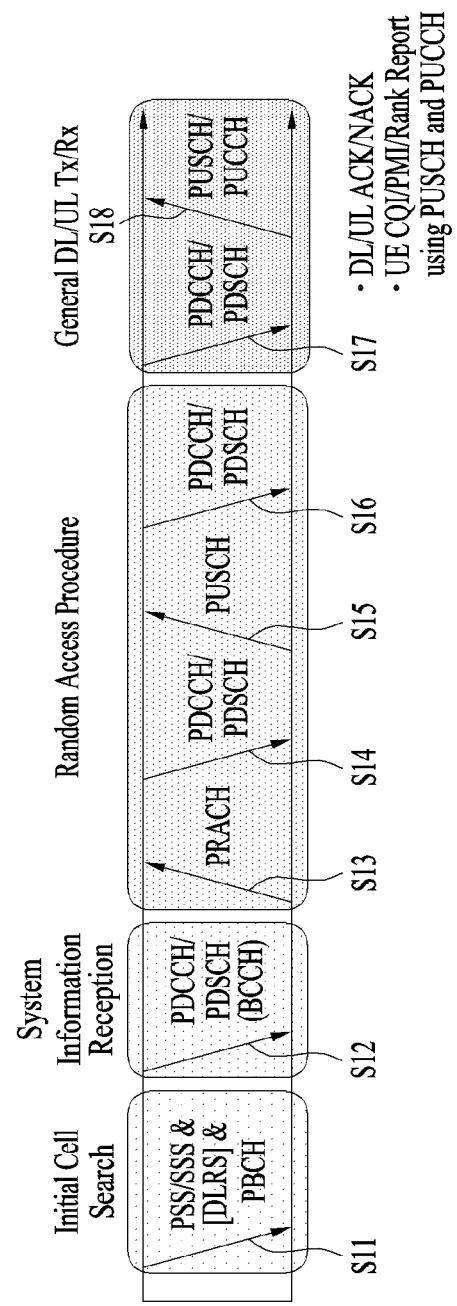
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
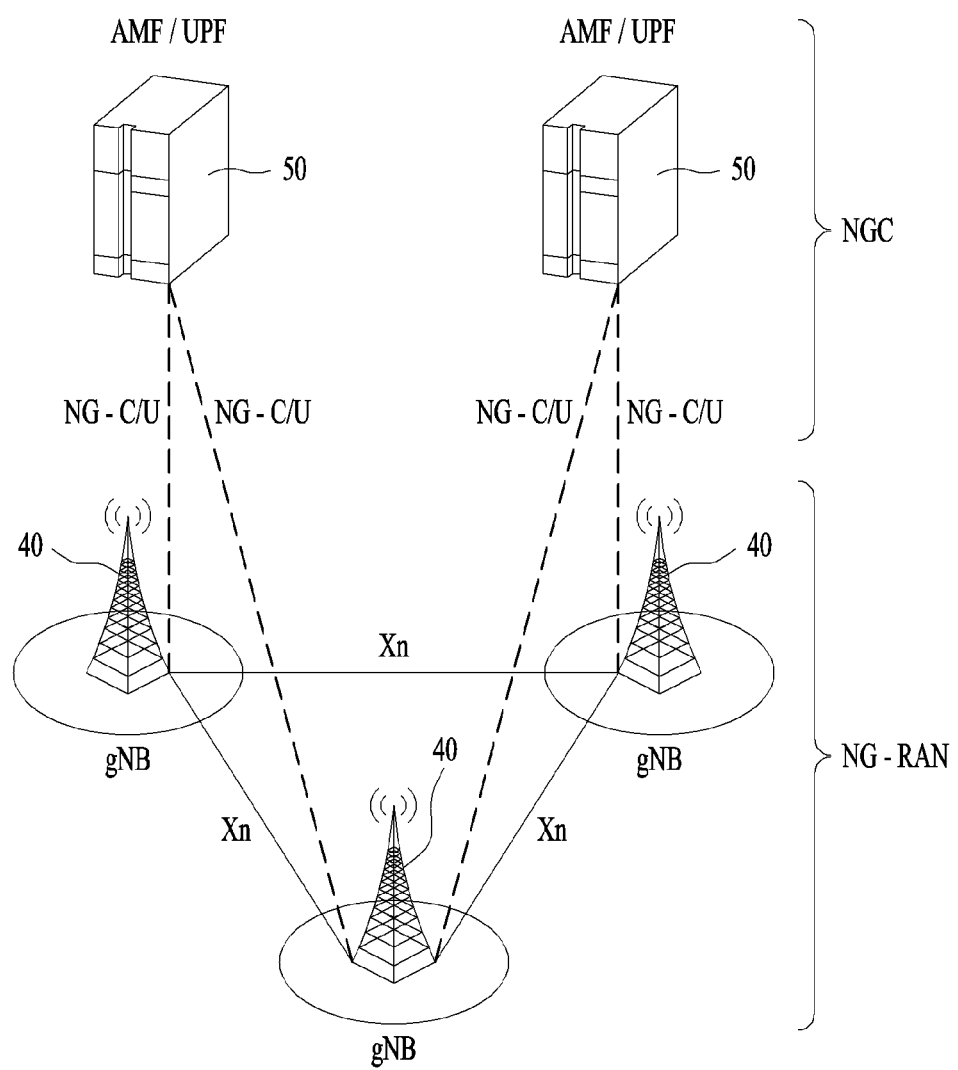
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
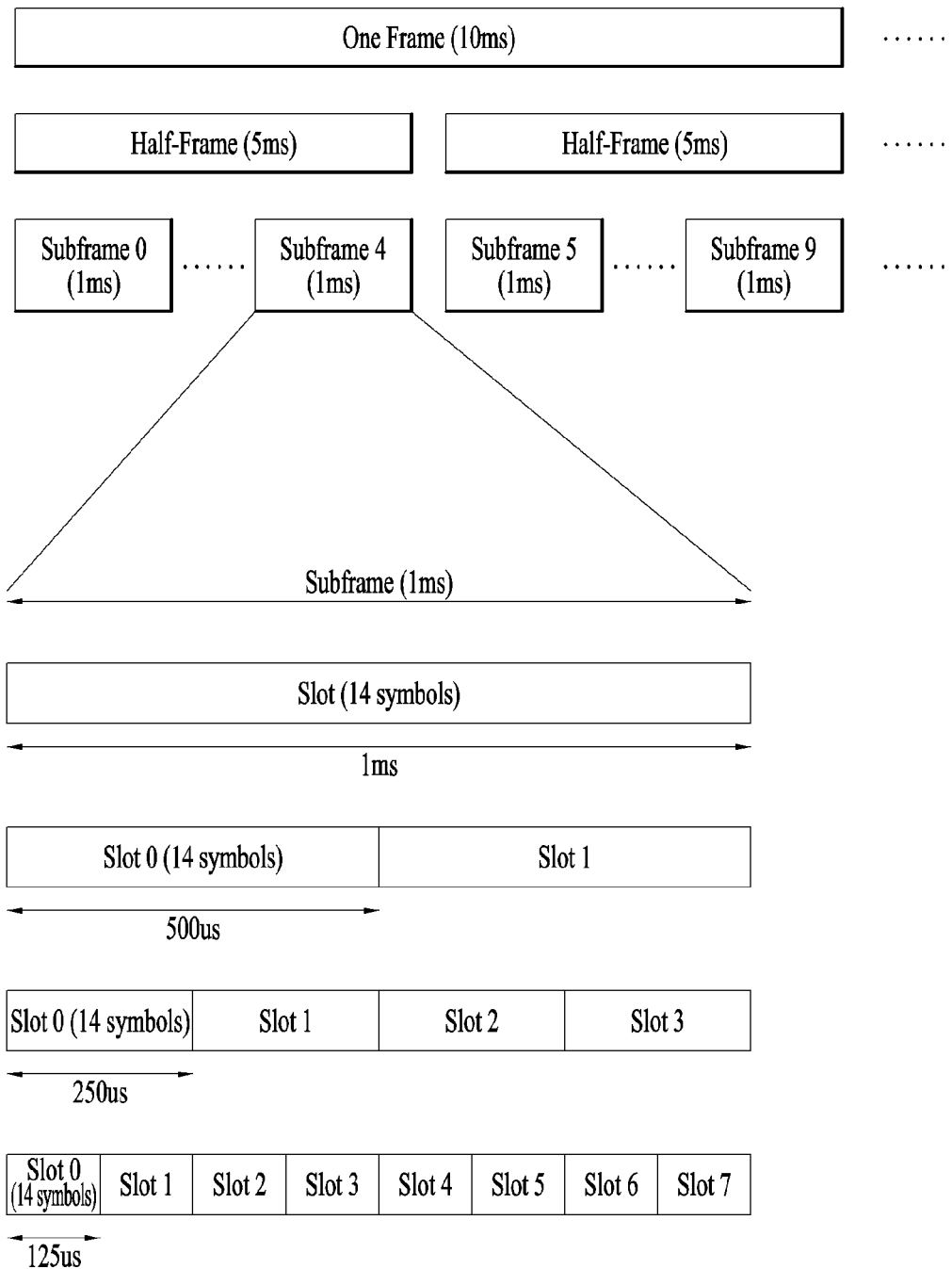
FIG. 3 illustrates the structure of an NR radio frame to which embodiment(s) are applicable.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

The frame structure is merely an example. The number of subframes, the number of slots, and the number of symbols in a frame may vary. In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol).

In NR, various numerologies (or SCSs) are supported to support various 5G services. For example, with an SCS of 15 kHz, a wide area in traditional cellular bands is supported, while with an SCS of 30/60 kHz, a dense urban area, a lower latency, and a wide carrier bandwidth are supported. With an SCS of 60 kHz or higher, a bandwidth larger than 24.25 GHz is be supported to overcome phase noise.

An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 4:
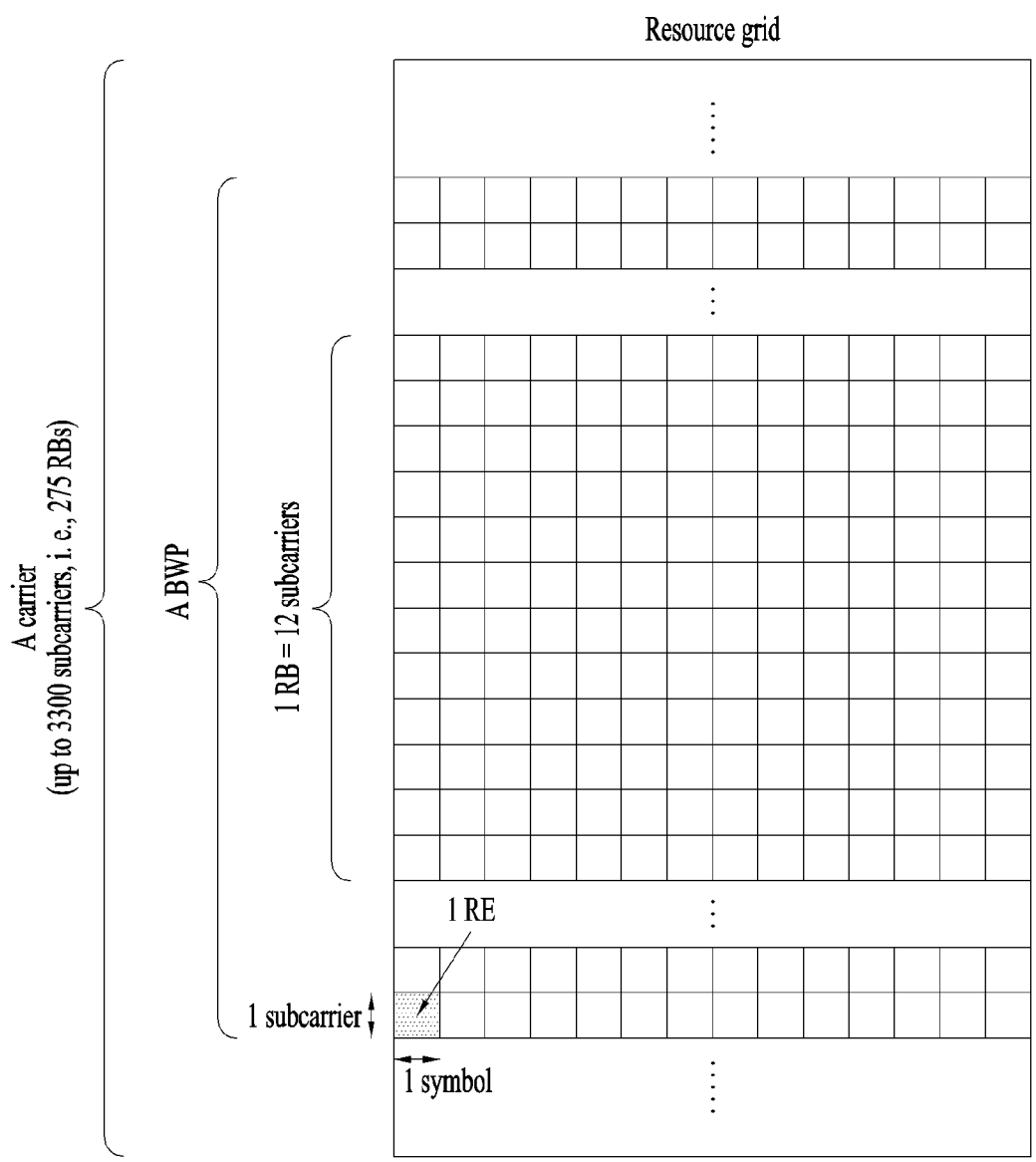
FIG. 4 illustrates the slot structure of an NR frame to which embodiment(s) are applicable.

FIG. 4 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Hereinafter, a hybrid automatic repeat request-acknowledgement (HARQ-ACK) operation will be described in detail.

Figure 5:
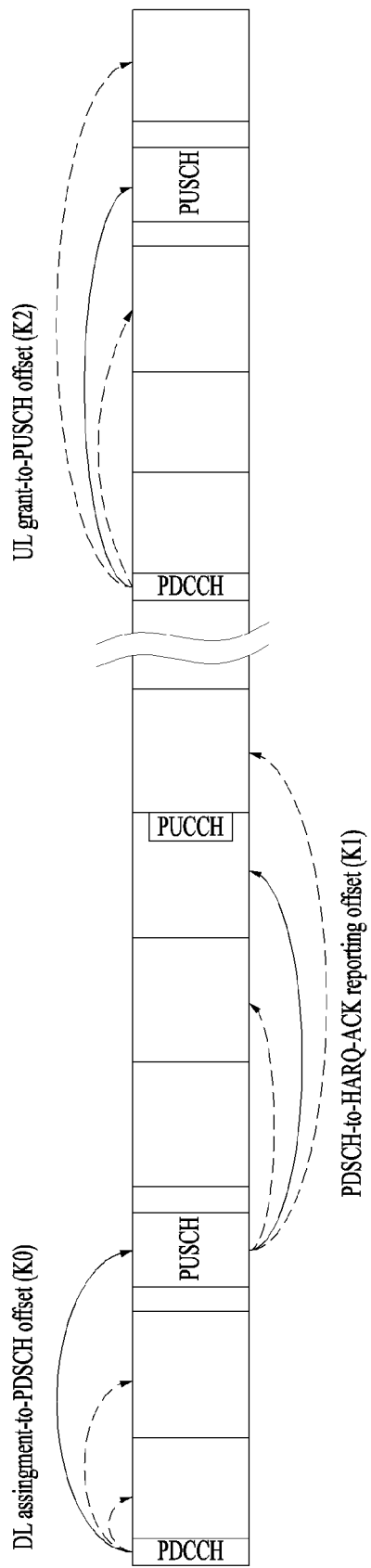
FIG. 5 is a diagram for explaining a hybrid automatic repeat request acknowledgement (HARQ-ACK) operation.

FIG. 5 is a diagram for explaining a HARQ-ACK operation.

HARQ-ACK information is information indicating whether a UE successfully receives a DL signal (e.g., DL control signal or DL data signal). Hereinafter, a UE may be referred to as a terminal according to embodiments. When a UE successfully receives a DL signal, the UE may transmit an acknowledgement (ACK) to a BS. When the UE does not successfully receive a DL signal, the UE may transmit a negative ACK (NACK) to the BS.

In NR, a HARQ-ACK may have the following characteristics: 1) and 2).

1) 1-bit HARQ-ACK feedback may be supported for each transport block (TB). In this document, HARQ-ACK feedback may have the same meaning as HARQ feedback. In this case, the operation of one DL HARQ process may be supported for some UEs, while the operation of one or more DL HARQ processes may be supported for a given UE.

2) The UE may support a set of minimum HARQ processing time. Here, the minimum HARQ processing time means the minimum time required for the UE to transmit a HARQ-ACK for DL data (e.g., PDSCH) after receiving the DL data. For the minimum HARQ processing time, two types of UE processing times (N1 and K1) may be defined depending on (1) symbol granularity and (2) slot granularity, where K1 may mean the number of slots from a slot for the PDSCH to a slot for the HARQ-ACK related to the PDSCH. That is, K1 may mean the number of slots from the slot in which the PDSCH is received to the slot in which the HARQ-ACK related to the PDSCH is transmitted.

From the viewpoint of the UE, N1 may mean the number of OFDM symbols required for UE processing from the end of the PDSCH reception to the earliest start time of the HARQ-ACK transmission related to the PDSCH. That is, N1 may mean the number of OFDM symbols required for UE processing from the time when the PDSCH reception ends to the earliest time when transmission of the HARQ-ACK related to the PDSCH starts. N1 may be defined as shown in Tables 4 and 5 below according to OFDM numerologies (i.e., subcarrier spacing) and DMRS patterns.

TABLE 4

| configuration | HARQ Timing Parameter | Units | 15 kHz SCS | 30 kHz SCS | 60 kHz SCS | 120 kHz SCS |
|---|---|---|---|---|---|---|
| Front-loaded DMRS only | N1 | Symbols | 8 | 10 | 17 | 20 |
| Front-loaded DMRS only + additional DMRS | N1 | Symbols | 13 | 13 | 20 | 24 |

TABLE 5

| configuration | HARQ Timing Parameter | Units | 15 kHz SCS | 30 kHz SCS | 60 kHz SCS |
|---|---|---|---|---|---|
| Front-loaded DMRS only | N1 | Symbols | 3 | 4.5 | 9(FR1) |
| Front-loaded DMRS only + additional DMRS | N1 | Symbols | [13] | [13] | [20] |

Referring to FIG. 5, a HARQ-ACK timing, K1 may mean the number of slots from a slot for a PDSCH to a slot for a HARQ-ACK related to the PDSCH. K0 denotes the number of slots from a slot having a DL grant PDCCH to a slot having related PDSCH transmission, and K2 denotes the number of slots from a slot having a UL grant PDCCH to a slot having related PUSCH transmission. Specifically, K1 may mean the number of slots from a slot in which a PDSCH is received to a slot in which a HARQ-ACK related to the PDSCH is transmitted. K0 may mean the number of slots from a slot in which a DL grant PDCCH is received to a slot in which a PDSCH related to the PDCCH is received. In addition, K2 may mean the number of slots from a slot in which a PDCCH including a UL grant is received to a slot in which a PUSCCH related to the PDCCH is transmitted. That is, K0, K1, and K2 may be briefly summarized as shown in Table 6 below.

TABLE 6

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The BS may provide a HARQ-ACK feedback timing to the UE dynamically in DCI or semi-statically through RRC signaling. For example, when a HARQ-ACK feedback timing is dynamically provided by DCI, a slot timing between A and B may be indicated among a set of values by a specific field in the DCI from a set of values. In addition, NR supports different minimum HARQ processing times between UEs. The HARQ processing time may include a delay between the reception timing of DL data and the transmission timing of a HARQ-ACK related to the DL data and a delay between the reception timing of a UL grant and the transmission timing of UL data related to the UL grant. The UE may provide its capability regarding the minimum HARQ processing time to the BS. Asynchronous and adaptive DL HARQ may be supported at least for eMBB and URLLC.

TABLE 7

Table 7 shows a timing from when a PDSCH is received to when HARQ-ACK information is transmitted, which is an excerpt from TS 38.214. In Table 7, parameters $d_{1,1}$ and $d_2$ may be determined according to TS 38.214 and TS 38.211.
If the first uplink symbol of the PUCCH which carries the HARQ-ACK information, as defined by the assigned HARQ-ACK timing K1 and the PUCCH resource to be used and including the effect of the timing advance, starts no earlier than at symbol L1, where L1 is defined as the next uplink symbol with its CP starting after
$T_{p\infty,l} = (N_1 + d_{1,1} + d_2)(2048 + 144) \cdot \kappa 2^{-\mu} \cdot T_c + T_\infty$ after the end of the last symbol of the PDSCH carrying the TB being acknowledged, then the UE shall provide a valid HARQ-ACK message.
$N_l$ is based on $\mu$ of table 5.3-1 and table 5.3-2 for UE processing capability 1 and 2 respectively, where $\mu$ corresponds to the one of ($\mu_{PDCCH}, \mu_{PDSCH}, \mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in clause 4.1 of [4, TS 38.211]. Otherwise the UE may not provide a valid HARQ-ACK corresponding to the scheduled PDSCH. The value of $T_{proc,1}$, is used both in the case of normal and extended cyclic prefix.
For a PDSCH that consists of two PDSCH transmission occasions in time domain in one slot, $d_{1,1}$ is calculated based on the first PDSCH transmission occasion in the slot, and as described above.

Table 5.3-1: PDSCH processing time for PDSCH processing capability 1

| | PDSCH decoding time $N_1$ [symbols] | |
|---|---|---|
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

Table 5.3-2: PDSCH processing time for PDSCH processing capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-Mapping TypeB |
|---|---|
| 0 | 3 |
| 1 | 4.5 |
| 2 | 9 for frequency range 1 |

From the perspective of the UE, HARQ ACK/NACK feedback on multiple DL transmissions in the time domain may be transmitted in one UL data/control region. The timing between reception of DL data and transmission of an acknowledgment related to the received DL data may be indicated by a field in DCI from a set of values, and the set of values may be configured by higher layers. The timing is defined at least when the timing is not known to the UE.

HARQ-ACK Codebook

In NR, a dynamic HARQ-ACK codebook and a semi-static HARQ-ACK codebook may be supported. A HARQ-ACK codebook may be replaced with a HARQ-ACK payload.

For the dynamic HARQ-ACK codebook, a total downlink assignment index (T-DAI) field and/or a counter downlink assignment index (C-DAI) field may be configured in DCI. The UE may generate HARQ-ACK information for a PDSCH actually scheduled by PDCCH monitoring occasions based on T-DAI and/or C-DAI values and transmit the information to the BS. The dynamic HARQ-ACK codebook may be referred to as a Type 2 HARQ-ACK codebook, which will be described later.

When the dynamic HARQ-ACK codebook is configured, the size of a HARQ-ACK payload may change depending on the amount of scheduled DL data. To this end, a PDCCH scheduling a DL signal may include a C-DAI and a T-DAI. The C-DAI indicates a scheduling order of {CC, slot} calculated in a component carrier (CC) first manner (or in a cell first manner) and is used to designate the position of a HARQ-ACK bit in the HARQ-ACK codebook. The T-DAI indicates a slot-level scheduling cumulative value up to the current slot and is used to determine the size of the HARQ-ACK codebook.

For the semi-static HARQ-ACK codebook, HARQ-ACK bit(s) may be generated for all PDCCH monitoring occasions associated with a specific PUCCH transmission time and then transmitted in consideration of multiple PDSCH-to-HARQ-ACK feedback timings configured to the UE. The semi-static HARQ-ACK codebook may be referred to as a Type 1 HARQ-ACK codebook, which will be described later. In the semi-static HARQ-ACK codebook, a PDSCH that is not scheduled on the PDCCH monitoring occasions may be regarded as a NACK When carrier aggregation is applied, HARQ-ACK transmissions for multiple cells may be multiplexed and transmitted on one PUCCH.

Non-Terrestrial Networks Reference

Figure 6:
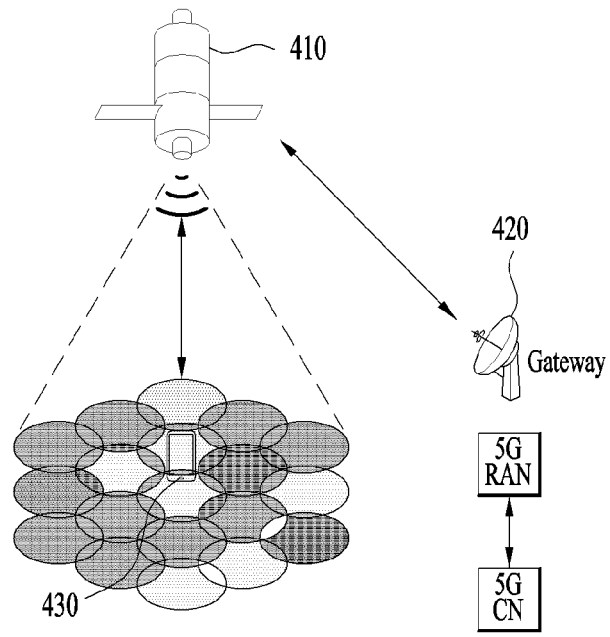
FIG. 6 illustrates a non-terrestrial network (NTN).
Figure 6:
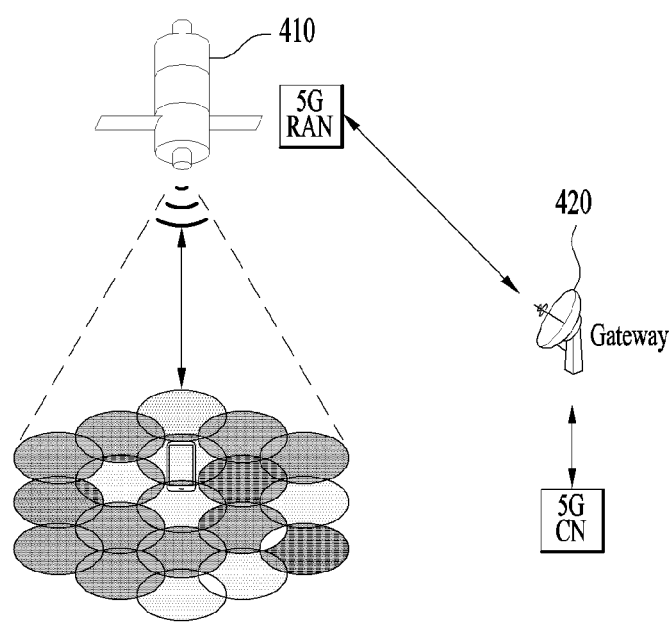

FIG. 6 illustrates a non-terrestrial network (NTN).

A non-terrestrial network (NTN) refers to a wireless network configured using satellites (e.g., geostationary earth orbit satellites (GEO)/low-earth orbit satellites (LEO)). Based on the NTN, coverage may be extended and a highly reliable network service may be provided. For example, the NTN may be configured alone, or may be combined with a conventional terrestrial network to configure a wireless communication system. For example, in the NTN network, i) a link between a satellite and a UE, ii) a link between satellites, iii) a link between a satellite and a gateway, and the like may be configured.

The following terms may be used to describe the configuration of a wireless communication system employing satellites.

Satellite: a space-borne vehicle embarking a bent pipe payload or a regenerative payload telecommunication transmitter, placed into Low-Earth Orbit (LEO) typically at an altitude between 500 km to 2000 km, Medium-Earth Orbit (MEO) typically at an altitude between 8000 to 20000 lm, or Geostationary satellite Earth Orbit (GEO) at 35 786 km altitude.

Satellite network: Network, or segments of network, using a space-borne vehicle to embark a transmission equipment relay node or base station.

Satellite RAT: a RAT defined to support at least one satellite.

5G Satellite RAT: a Satellite RAT defined as part of the New Radio.

5G satellite access network: 5G access network using at least one satellite.

Terrestrial: located at the surface of Earth.

Terrestrial network: Network, or segments of a network located at the surface of the Earth.

Use cases that may be provided by a communication system employing a satellite connection may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

For example, a 5G satellite access network may be connected to a 5G core Network. In this case, the satellite may be a bent pipe satellite or a regenerative satellite. The NR radio protocols may be used between the UE and the satellite. Also, F1 interface may be used between the satellite and the gNB.

As described above, a non-terrestrial network (NTN) refers to a wireless network configured using a device that is not fixed on the ground, such as satellite. A representative example is a satellite network. Based on the NTN, coverage may be extended and a highly reliable network service may be provided. For example, the NTN may be configured alone, or may be combined with an existing terrestrial network to configure a wireless communication system.

Use cases that may be provided by a communication system employing an NTN may be divided into three categories. The "Service Continuity" category may be used to provide network connectivity in geographic areas where 5G services cannot be accessed through the wireless coverage of terrestrial networks. For example, a satellite connection may be used for a UE associated with a pedestrian user or a UE on a moving land-based platform (e.g., car, coach, truck, train), air platform (e.g., commercial or private jet) or marine platform (e.g., marine vessel). In the "Service Ubiquity" category, when terrestrial networks are unavailable (due to, for example, disaster, destruction, economic situations, etc.), satellite connections may be used for IoT/public safety-related emergency networks/home access, etc. The "Service Scalability" category includes services using wide coverage of satellite networks.

Referring to FIG. 6, the NTN includes one or more satellites 410, one or more NTN gateways 420 capable of communicating with the satellites, and one or more UEs (/BSs) 430 capable of receiving mobile satellite services from the satellites. For simplicity, the description is focused on the example of the NTN including satellites, but is not intended to limit the scope of the present disclosure. Accordingly, the NTN may include not only the satellites, but also aerial vehicles (Unmanned Aircraft Systems (UAS) encompassing tethered UAS (TUA), Lighter than Air UAS (LTA), Heavier than Air UAS (HTA), all operating in altitudes typically between 8 and 50 km including High Altitude Platforms (HAPs)).

The satellite 410 is a space-borne vehicle equipped with a bent pipe payload or a regenerative payload telecommunication transmitter and may be located in a low earth orbit (LEO), a medium earth orbit (MEO), or a geostationary earth orbit (GEO). The NTN gateway 420 is an earth station or gateway existing on the surface of the earth, and provides sufficient RF power/sensitivity to access the satellite. The NTN gateway corresponds to a transport network layer (TNL) node.

The NTN may have i) a link between a satellite and a UE, ii) a link between satellites, iii) a link between a satellite and an NTN gateway. A service link refers to a radio link between a satellite and a UE. Inter-satellite links (ISLs) between satellites may be present when there are multiple satellites. A feeder link refers to a radio link between an NTN gateway and a satellite (or UAS platform). The gateway may be connected to a data network and may communicate with a satellite through the feeder link. The UE may communicate via the satellite and service link.

As NTN operation scenarios, two scenarios which are based on transparent payload and regenerative payload, respectively may be considered. FIG. 6-(*a*) shows an example of a scenario based on a transparent payload. In the scenario based on the transparent payload, the signal repeated by the payload is not changed. The satellites 410 repeat the NR-Uu radio interface from the feeder link to the service link (or vice versa), and the satellite radio interface (SRI) on the feeder link is NR-Uu. The NTN gateway 420 supports all functions necessary to transfer the signal of the NR-Uu interface. Also, different transparent satellites may be connected to the same gNB on the ground. FIG. 6-(*b*) shows an example of a scenario based on a regenerative payload. In the scenario based on the regenerative payload, the satellite 410 may perform some or all of the functions of a conventional BS (e.g., gNB), and may thus perform some or all of frequency conversion/demodulation/decoding/modulation. The service link between the UE and a satellite is established using the NR-Uu radio interface, and the feeder link between the NTN gateway and a satellite is established using the satellite radio interface (SRI). The SRI corresponds to a transport link between the NTN gateway and the satellite.

The UE 430 may be connected to 5GCN through an NTN-based NG-RAN and a conventional cellular NG-RAN simultaneously. Alternatively, the UE may be connected to the 5GCN via two or more NTNs (e.g., LEO NTN and GEO NTN, etc.) simultaneously.

Figure 7:
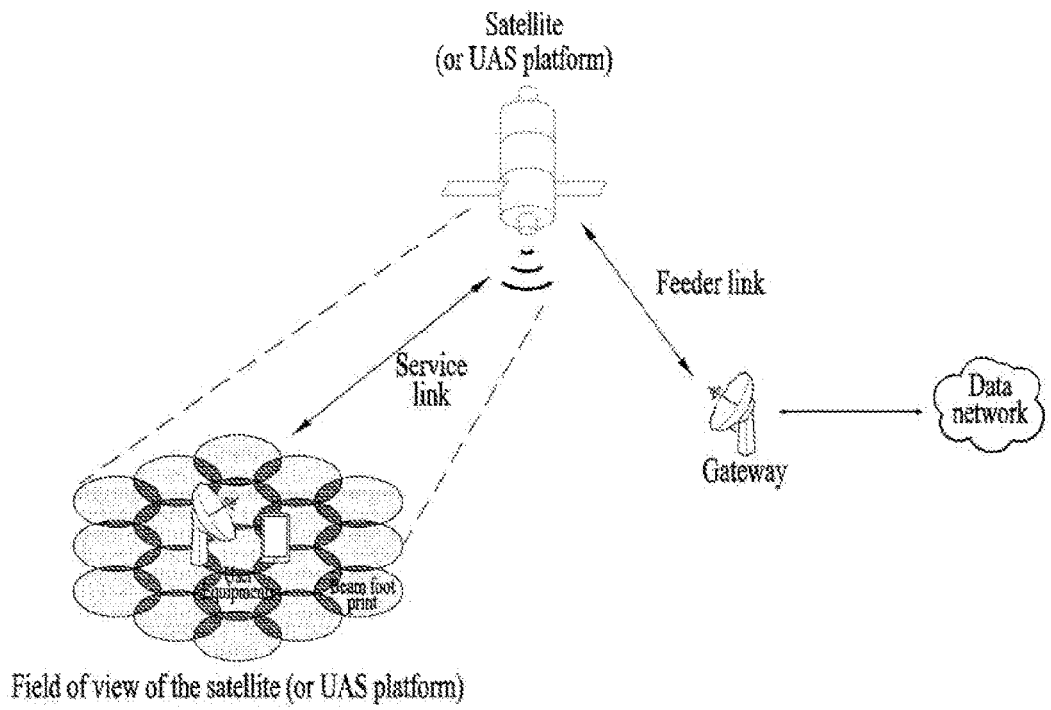
FIG. 7 illustrates an overview and a scenario of an NTN.
Figure 7:
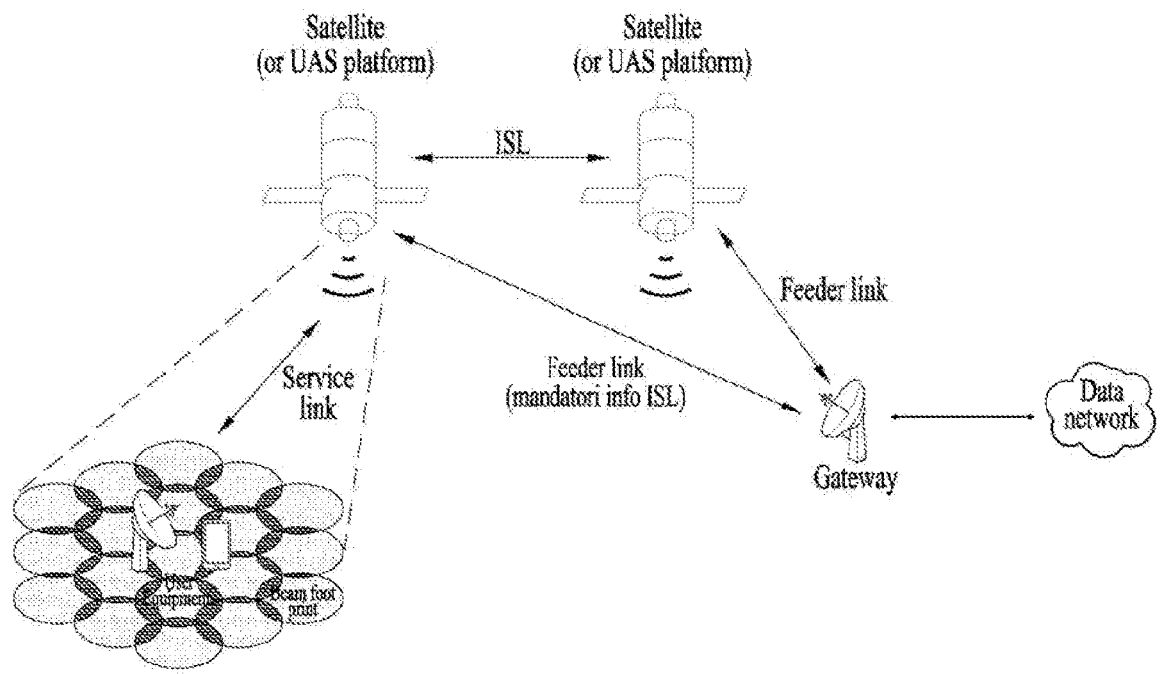

FIG. 7 illustrates an overview and a scenario of an NTN.

NTN refers to a network or network segment in which a satellite (or UAS platform) uses RF resources. Typical scenarios of the NTN providing access to a UE include an NTN scenario based on a transparent payload as shown in FIG. 7-(*a*) and an NTN scenario based on a regenerative payload as shown in FIG. 7-(*b*).

NTN typically features the following elements,
One or several sat-gateways that connect the Non-Terrestrial Network to a public data network
A GEO satellite is fed by one or several sat-gateways which are deployed across the satellite targeted coverage (e.g. regional or even continental coverage). We assume that UE in a cell is served by only one sat-gateway.

A Non-GEO satellite served successively by one or several sat-gateways at a time. The system ensures service and feeder link continuity between the successive serving sat-gateways with sufficient time duration to proceed with mobility anchoring and hand-over.

A feeder link or radio link between a sat-gateway and the satellite (or UAS platform)

A service link or radio link between the user equipment and the satellite (or UAS platform).

A satellite (or UAS platform) which may implement either a transparent or a regenerative (with on board processing) payload. The satellite (or UAS platform) generates beams typically generate several beams over a given service area bounded by its field of view. The footprints of the beams are typically of elliptic shape. The field of view of a satellites (or UAS platforms) depends on the on board antenna diagram and min elevation angle.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

Inter-satellite links (ISL) optionally in case of a constellation of satellites. This will require regenerative payloads on board the satellites. ISL may operate in RF frequency or optical bands.

User Equipment is served by the satellite (or UAS platform) within the targeted service area.

Table 8 below defines various types of satellites (or UAS platforms).

TABLE 8

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with | 200-3500 km |
| UAS platform (including HAPS) | 8-50 km (20 km for HAPS) | respect to a given earth point | 5-200 km |
| High Elliptical Orbit (HEO) satellite | 400-50000 km | Elliptical around the earth | 200-3500 km |

Typically, GEO satellite and UAS are used to provide continental, regional or local service. A constellation of LEO and MEO is used to provide services in both Northern and Southern hemispheres. In some case, the constellation can even provide global coverage including polar regions. For the later, this requires appropriate orbit inclination, sufficient beams generated and inter-satellite links. HEO satellite systems are not considered in this document.

An NTN that provides access to a terminal in six reference scenarios described below can be considered.

Circular orbiting and notional station keeping platforms.

Highest RTD constraint

Highest Doppler constraint

A transparent and a regenerative payload

One ISL case and one without ISL. Regenerative payload is mandatory in the case of inter-satellite links.

Fixed or steerable beams resulting respectively in moving or fixed beam foot print on the ground Six scenarios are considered as depicted in Table 9 and are detailed in Table 10.

TABLE 9

|  | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

TABLE 10

| | Scenarios | |
|---|---|---|
| | GEO based non-terrestrial access network (Scenario A and B) | LEO based non-terrestrial access network (Scenario C & D) |
| Orbit type | notional station keeping position fixed in terms of elevation/azimuth rwith espect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth capability (service link) | 30 MHz for band <6 GHz<br>1 GHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes/No (Both cases are possible.) |
| Earth-fixed beams | Yes | Scenario C1: Yes (steerable beams), see note 1<br>Scenario C2: No move (the beams with the satellite)<br>Scenario D 1: Yes (steerable beams), see note 1<br>Scenario D 2: No (the beams move with the satellite) |
| Max beam foot print size (edge to edge) regardless of the elevation angle | 3500 km (Note 5) | 1000 km |
| Min Elevation angle for both sat-gateway and user equipment | 10° for service link and 10° for feeder link | 10° for service link and 10° for feeder link |
| Max distance between satellite and user equipment at min elevation angle | 40,581 km | 1,932 km (600 km altitude)<br>3,131 km (1,200 km altitude) |
| Max Round Trip Delay (propagation delay only) | Scenario A: 541.46 ms (service and feeder links)<br>Scenario B: 270.73 ms (service link only) | Scenario C: (transparent payload: service and feeder links)<br>−25.77 ms (600 km)<br>−41.77 ms (1200 km)<br>Scenario D: (regenerative payload: service link only)<br>−12.89 ms (600 km)<br>−20.89 ms (1200 km) |
| Max differential delay within a cell (Note 6) | 10.3 ms | 3.12 ms and 3.18 ms for respectively 600 km and 1200 km |
| Max Doppler shift (earth fixed user equipment) | 0.93 ppm | 24 ppm (600 km)<br>21 ppm (1200 km) |
| Max Doppler shift variation (earth fixed user equipment) | 0.000 045 ppm/s | 0.27 ppm/s (600 km )<br>0.13 ppm/s (1200 km) |
| User equipment motion on the earth | 1200 km/h (e.g. aircraft) | 500 km/h (e.g. high speed train) Possibly 1200 km/h (e.g. aircraft) |
| User equipment antenna types | Omnidirectional antenna (linear polarisation), assuming 0 dBi<br>Directive antenna (up to 60 cm equivalent aperture diameter in circular polarisation) | |
| User equipment Tx power | Omnidirectional antenna: UE power class 3 with up to 200 mW<br>Directive antenna: up to 20 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1:
Each satellite has the capability to steer beams towards fixed points on earth using beamforming techniques. This is applicable for a period of time corresponding to the visibility time of the satellite NOTE 2:
Max delay variation within a beam (earth fixed user equipment) is calculated based on Min Elevation angle for both gateway and user equipment NOTE 3:
Max differential delay within a beam is calculated based on Max beam foot print diameter at nadir NOTE 4:
Speed of light used for delay calculation is 299792458 m/s.

NOTE 5:
The Maximum beam foot print size for GEO is based on current state of the art GEO High Throughput systems, assuming either spot beams at the edge of coverage (low elevation).

NOTE 6:
The maximum differential delay at cell level has been computed considering the one at beam level for largest beam size. It doesn't preclude that cell may include more than one beam when beam size are small or medium size. However the cumulated differential delay of all beams within a cell will not exceed the maximum differential delay at cell level in the table above.

The NTN study results apply to GEO scenarios as well as all NGSO scenarios with circular orbit at altitude greater than or equal to 600 km.

Hereinafter, the NTN reference point will be described.

Figure 8:
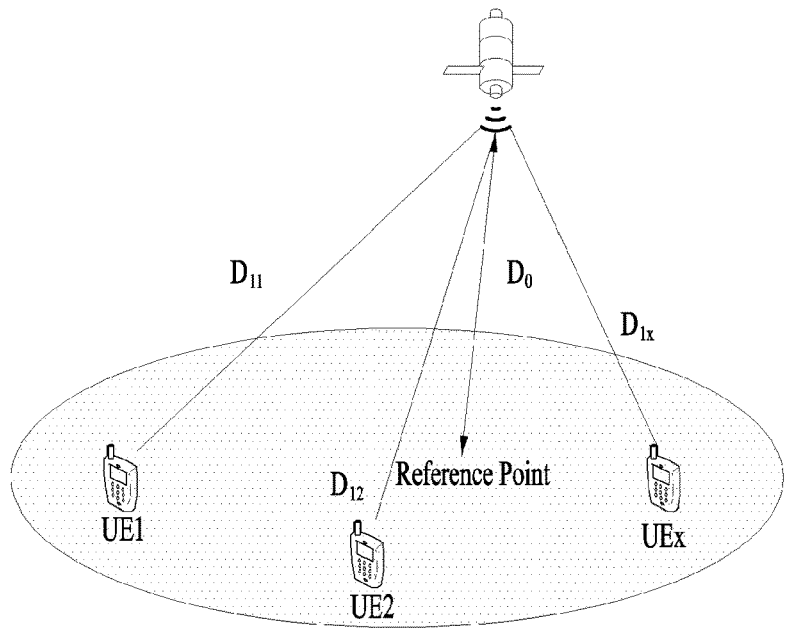
FIG. 8 illustrates TA components of the NTN.
Figure 8:
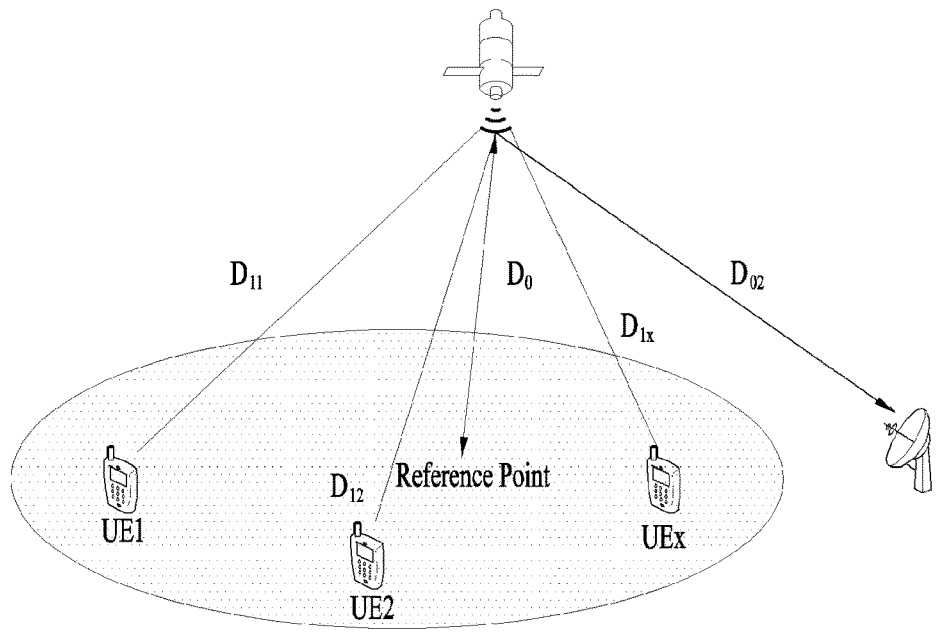

FIG. 8 illustrates TA components of the NTN. Here, the TA offset (NTAoffset) may not be plotted.

With consideration on the larger cell coverage, long round trip time (RTT) and high Doppler, enhancements are considered to ensure the performance for timing and frequency synchronization for UL transmission.

Referring to FIG. 8, a reference point related to timing advance (TA) of initial access and subsequent TA maintenance/management is illustrated. Terms defined in relation to FIG. 8 are described below.

Option 1: Autonomous acquisition of the TA at UE with UE known location and satellite ephemeris.

Regarding option 1, the required TA value for UL transmission including PRACH can be calculated by the UE. The corresponding adjustment can be done, either with UE-specific differential TA or full TA (consisting of UE specific differential TA and common TA).

Except the full TA compensation at the UE side, both the alignment on the UL timing among UEs and DL and UL frame timing at network side can be achieved. However, in case of satellite with transparent payload, further discussion on how to handle the impact introduced by feeder link will be conducted in normative work. Additional needs for the network to manage the timing offset between the DL and UL frame timing can be considered, if impacts introduced by feeder link is not compensated by UE in corresponding compensation.

Except the UE specific differential TA only, additional indication on a single reference point should be signalled to UEs per beam/cell for achieving the UL timing alignment among UEs within the coverage of the same beam/cell. Timing offset between DL and UL frame timing at the network side should also be managed by the network regardless of the satellite payload type.

With concern on the accuracy on the self-calculated TA value at the UE side, additional TA signalling from network to UE for TA refinement, e.g., during initial access and/or TA maintenance, can be determined in the normative work.

Option 2: Timing advanced adjustment based on network indication

Regarding option 2, the common TA, which refers to the common component of propagation delay shared by all UEs within the coverage of same satellite beam/cell, is broadcasted by the network per satellite beam/cell. The calculation of this common TA is conducted by the network with assumption on at least a single reference point per satellite beam/cell.

The indication for UE-specific differential TA from network as the Rel-15 TA mechanism is also needed. For satisfying the larger coverage of NTN, extension of value range for TA indication in RAR, either explicitly or implicitly, is identified. Whether to support negative TA value in corresponding indication will be determined in the normative phase. Moreover, indication of timing drift rate, from the network to UE, is also supported to enable the TA adjustment at UE side.

For calculation of common TA in the above two options, single reference point per beam is considered as the baseline. Whether and how to support the multiple reference points can be further discussed in the normative work.

For the UL frequency compensation, at least for LEO system, the following solutions are identified with consideration on the beam specific post-compensation of common frequency offset at the network side:

Regarding option 1, both the estimation and pre-compensation of UE-specific frequency offset are conducted at the UE side. The acquisition of this value can be done by utilizing DL reference signals, UE location and satellite ephemeris.

Regarding option 2, the required frequency offset for UL frequency compensation at least in LEO systems is indicated by the network to UE. The acquisition on this value can be done at the network side with detection of UL signals, e.g., preamble.

Indication of compensated frequency offset values by the network is also supported in case that compensation of the frequency offset is conducted by the network in the uplink and/or the downlink, respectively. However, indication of Doppler drift rate is not necessary.

Hereinafter, more delay-tolerant re-transmission mechanisms will be described in detail.

As follows, two main aspects of a retransmission mechanism with improved delay tolerance can be discussed.

Disabling of HARQ in NR NTN

HARQ optimization in NR-NTN

HARQ Round Trip Time in NR is of the order of several ms. The propagation delays in NTN are much longer, ranging from several milliseconds to hundreds of milliseconds depending on the satellite orbit. The HARQ RTT can be much longer in NTN. It was identified early in the study phase that there would be a need to discuss potential impact and solutions on HARQ procedure. RAN1 has focused on physical layer aspects while RAN2 has focused on MAC layer aspects.

In this regard, disabling of HARQ in NR NTN may be considered.

It was discussed that when UL HARQ feedback is disabled, there could be issues if ① MAC CE and RRC signalling are not received by UE, or ② DL packets not correctly received by UE for a long period of time without gNB knowing it.

The following were discussed without convergence on the necessity of introducing such solutions for NTN when HARQ feedback is disabled (1) Indicate HARQ disabling via DCI in new/re-interpreted field [60], [61]

(2) New UCI feedback for reporting DL transmission disruption and or requesting DL scheduling changes [62], [63]

The following possible enhancements for slot-aggregation or blind repetitions were considered. There is no convergence on the necessity of introducing such enhancements for NTN.

(1) Greater than 8 slot-aggregation [64]

(2) Time-interleaved slot aggregation [65]

(3) New MCS table [66]

Next, a method for optimizing HARQ for the NR NTN will be described.

Solutions to avoid reduction in peak data rates in NTN were discussed. One solution is to increase the number of HARQ processes to match the longer satellite round trip delay to avoid stop-and-wait in HARQ procedure. Another solution is to disable UL HARQ feedback to avoid stop-and-wait in HARQ procedure and rely on RLC ARQ for reliability. The throughput performance for both types of solutions was evaluated at link level and system level by several contributing companies.

The observations from the evaluations performed on the effect of the number of HARQ processes on performance are summarized as follows:

Three sources [72][64][70] provided link-level simulations of throughput versus SNR with the following observations:

One source simulated with a TDL-D suburban channel with elevation angle of 30 degrees with BLER target of 1% for RLC ARQ with 16 HARQ processes, and BLER targets 1% and 10% with 32/64/128/256 HARQ processes. There was no observable gain in throughput with increased number of HARQ processes compared to RLC layer re-transmission with RTT in {32, 64, 128, 256} ms.

One source simulated with a TDL-D suburban channel with elevation angle of 30 degrees with BLER targets of 0.10% for RLC ARQ with 16 HARQ processes, and BLER targets 1% and 10% with 32 HARQ processes. An average throughput gains of 10% was observed with 32 HARQ processes compared to RLC ARQ with 16 HARQ processes with RTT=32 ms.

One source provides the simulation results in following cases with RTT=32 ms, e.g., assuming BLER targets at 1% for RLC ARQ with 16 HARQ processes, BLER targets 1% and 10% with 32 HARQ processes. There is no observable gain in throughput with 32 HARQ processes compared to RLC ARQ with 16 HARQ processes in case that channel is assumed as TDL-D with delay spread/K-factor taken from system channel model in suburban scenario with elevation angle 30. Performance gain can be observed with other channels, especially, up to 12.5% spectral efficiency gain is achieved in case that channel is assumed as TDL-A in suburban with 30° elevation angle. Moreover, simulation based on the simulation with consideration on other scheduling operations: (i) additional MCS offset, (ii) MCS table based on lower efficiency (iii) slot aggregation with different BLER targets are conducted. Significant gain can be observed with enlarging the HARQ process number.

One source [73] provided system level simulations for LEO=1200 km with 20% resource utilization, 16 and 32 HARQ processes, 15 and 20 UEs per cell, proportional fair scheduling, and no frequency re-use. The spectral efficiency gain per user with 32 HARQ processes compared to 16 HARQ processes depends on the number of UEs. With 15 UEs per beam, an average spectral efficiency gain of 12% at 50% per centile is observed. With 20 UEs per cell there is no observable gain.

The following options were considered with no convergence on which option to choose:

Option A: Keep 16 HARQ process IDs and rely on RLC ARQ for HARQ processes with UL HARQ feedback disabled via RRC Option B: Greater than 16 HARQ process IDs with UL HARQ feedback enabled via RRC with following consideration. In this case, in the case of 16 or more HARQ process IDs, maintenance of a 4-bit HARQ process ID field in UE capability and DCI may be considered.

Alternatively, the following solutions may be considered for 16 or more HARQ processes keeping the 4-bit HARQ process ID field in DCI:

Slot number based [62], [67], [68], [60], [69]

Virtual process ID based with HARQ re-transmission timing restrictions [61]

Reuse HARQ process ID within RTD (time window) [69]

Re-interpretation of existing DCI fields with assistance information from higher layers [70]

One source also considered solutions where the HARQ process ID field is increased beyond 4 bits [65]

With regards to HARQ enhancements for soft buffer management and stop-and-wait time reduction, the following options were considered with no convergence on which, if any, of the options, to choose:

Option A-1: Pre-active/pre-emptive HARQ to reduce stop-and-wait time

Option A-2: Enabling/disabling of HARQ buffer usage configurable on a per UE and per HARQ process [67], [64], [69]

Option A-3: HARQ buffer status report from the UE [67]

The number of HARQ processes with additional considerations for HARQ feedback, HARQ buffer size, RLC feedback, and RLC ARQ buffer size should be discussed further when specifications are developed.

Figure 9:
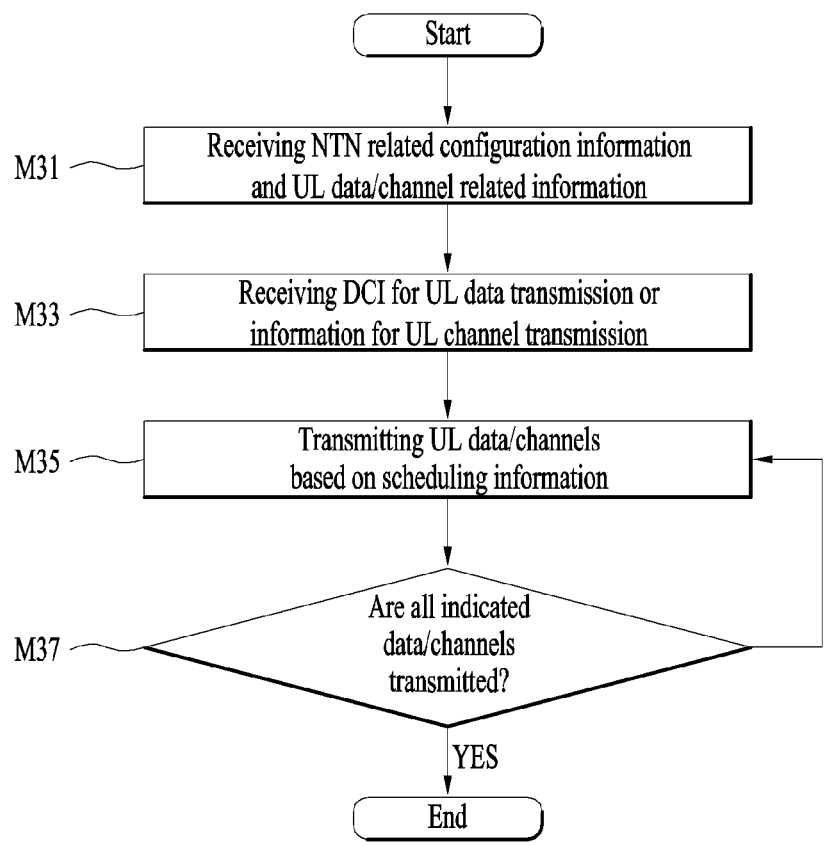
FIG. 9 is a flowchart illustrating a method for a user equipment (UE) to transmit an uplink (UL) signal in an NTN according to an embodiment.
Figure 10:
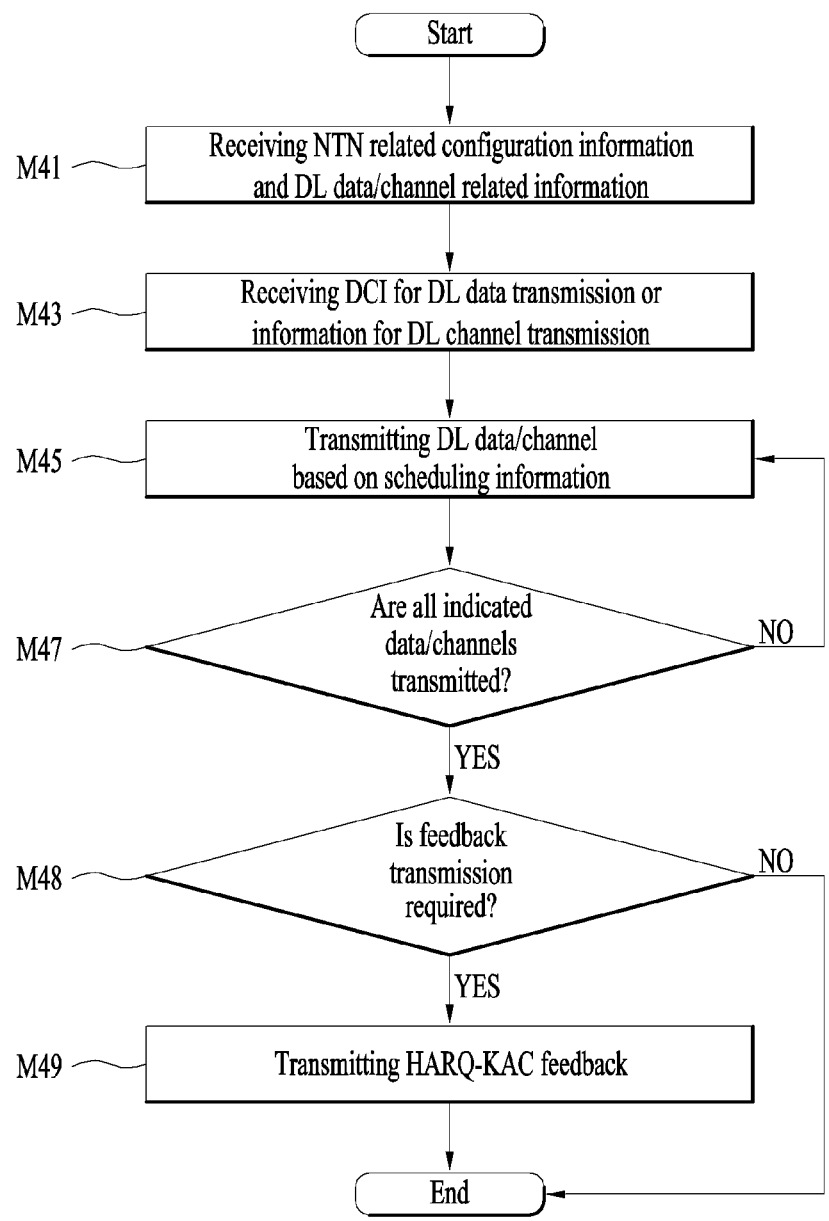
FIG. 10 is a flowchart illustrating a method for a UE to receive a downlink (DL) signal in an NTN according to an embodiment.

FIG. 9 is a flowchart illustrating a method for a UE to transmit a UL signal in an NTN according to an embodiment, and FIG. 10 is a flowchart illustrating a method for a UE to receive a DL signal in an NTN according to an embodiment.

At least one of the steps shown in FIGS. 9 and 10 may be omitted depending on situations or configurations, and the steps shown in FIGS. 9 and 10 are merely for convenience of explanation and thus do not limit the scope of the present disclosure.

Referring to FIG. 9, the UE may receive NTN related configuration information and UL data/channel related information (M31). Next, the UE may receive DCI/control information for transmission of UL data/channels (M33). The DCI/control information may include scheduling information for transmission of the UL data/channels. Then, the UE may transmit the UL data/channels based on the scheduling information (M35). The UE may perform UL transmission until all the configured/indicated UL data/channels are transmitted. When all the UL data/channels are transmitted, the UE may terminate the corresponding UL transmission (M37).

Referring to FIG. 10, the UE may receive NTN related configuration information and DL data/channel related information (M41). Next, the UE may receive DCI/control information for reception of DL data/channels (M43). The DCI/control information may include scheduling information of the DL data/channels. The UE may receive the DL data/channels based on the scheduling information (M45). The UE may receive DL data/channels until all the configured/indicated DL data/channels are received. When all DL data/channels are received, the UE may determine whether feedback information for the received DL data/channels is required (M47 and M48). If the UE needs to transmit the feedback information, the UE may transmit HARQ-ACK feedback (or HARQ feedback). Otherwise, the UE may terminate the reception operation without transmitting the HARQ-ACK feedback (M49).

Figure 11:
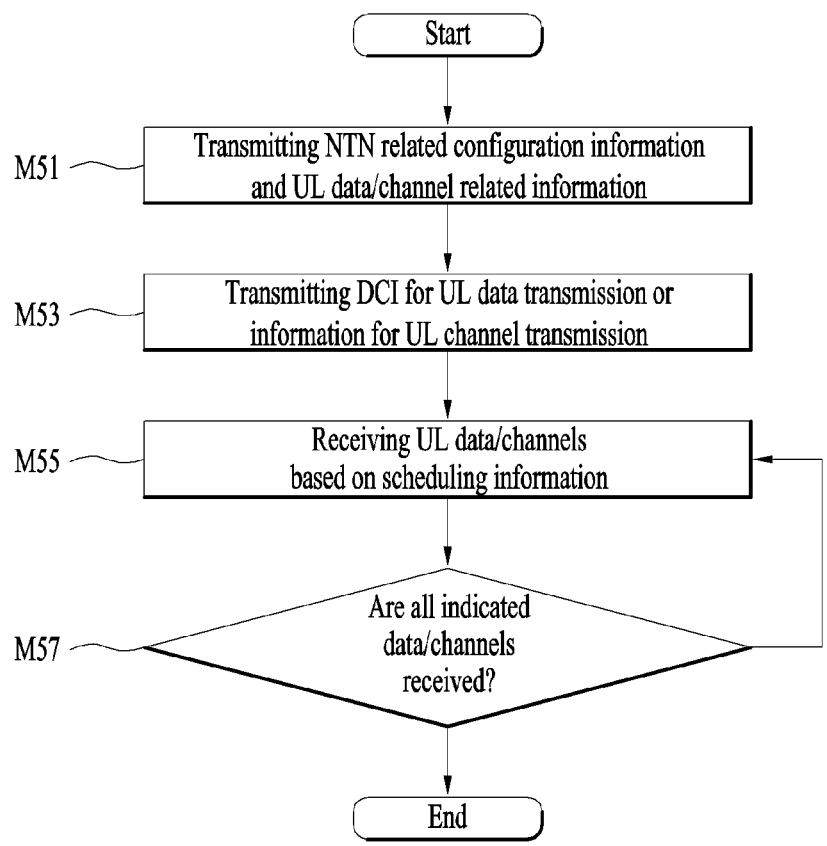
FIG. 11 is a flowchart illustrating a method for a base station (BS) to receive a UL signal in an NTN according to the above-described embodiment.
Figure 12:
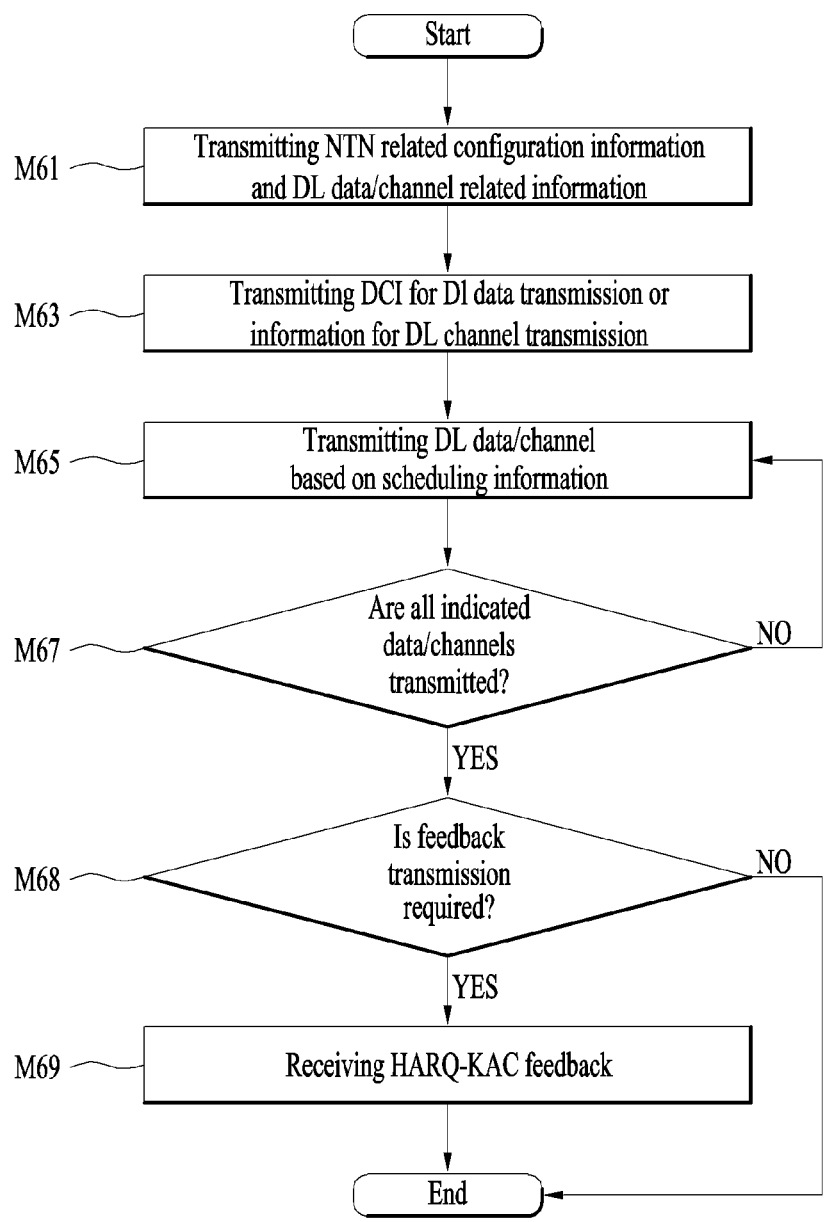
FIG. 12 is a flowchart illustrating a method for a BS to transmit a DL signal in an NTN according to the above-described embodiment.

FIG. 11 is a flowchart illustrating a method for a BS to receive a UL signal in an NTN according to an embodiment, and FIG. 12 is a flowchart illustrating a method for a BS to transmit a DL signal in an NTN according to an embodiment. At least one of the steps shown in FIGS. 11 and 12 may be omitted depending on situations or configurations, and the steps shown in FIGS. 11 and 12 are merely for convenience of explanation and thus do not limit the scope of the present disclosure.

Referring to FIG. 11, the BS may transmit NTN related configuration information, UL data/channel related information to the UE (M51). Thereafter, the BS may transmit (to the UE) DCI/control information for transmission of UL data and/or UL channels (M53). The DCI/control information may include scheduling information for the UE to transmit the UL data/channels. The BS may receive (from the UE) the UL data/channels transmitted based on the scheduling information (M55). The BS may perform UL reception operation until all the configured/indicated UL data/channels are received. When all the UL data/channels are received, the BS may terminate the corresponding UL reception (M57).

Referring to FIG. 12, the BS may transmit NTN related configuration information and DL data/channel related information (to the UE) (M61). Thereafter, the BS may transmit (to the UE) DCI/control information for reception of DL data/channels (M63). The DCI/control information may include scheduling information on the DL data/channels. The BS may transmit the DL data/channels (to the UE) based on the scheduling information (M65). The BS may perform DL transmission until all configured/indicated DL data/channels are transmitted. When the BS transmits all DL data/channels, the BS may determine whether the BS needs to receive feedback information for the DL data/channels (M67 and M68). When the BS needs to receive the feedback information, the BS may receive HARQ-ACK feedback. Otherwise, the BS may terminate the DL transmission without receiving the HARQ-ACK feedback (M69).

EMBODIMENTS

The above contents (e.g., NR frame structure, NTN system, etc.) are applicable in combination with methods proposed in the present disclosure, which will be described later. Alternatively, the contents may clarify the technical features of the methods proposed in the present disclosure.

Methods for HARQ disabling/HARQ enhancement, which will be described later, are related to UL signal transmission, and the methods may be equally applied to DL signal transmission in the above-described NR or LTE system. Thus, it is obvious that the terms, expressions, and structures in this document may be modified to be suitable for the above-described system in order to implement the technical idea of the present disclosure in the corresponding system.

To guarantee wide coverage or provide wireless communication services in a place where it is not easy to install BSs for wireless communication, it is considered to provide a NR NTN or a LTE NTN. In legacy terrestrial network (TN) services such as NR and LTE services, a BS may be installed on the ground to provide wireless communication services to UEs. Instead of installing BSs on the ground, the NTN provides wireless communication services to UEs by installing BSs on non-terrestrial locations such as satellites (geo-stationary orbit, low orbit, medium orbit, etc.), airplanes, unmanned aerial vehicles, drones, etc.

Frequency bands considered for NR NTN service are a band of 2 GHz (S-band: 2 to 4 GHz) in bands below 6 GHz and a DL band of 20 GHz and a UL band of 30 GHz (Ka-Band: 26.5 to 40 GHz) in bands above 6 GHz.

In the worst scenario (GEO scenario A) shown in Table 10 above, the delay may increase up to 540 ms. In this case, a latency problem may occur due to a large delay when the UE performs HARQ feedback. Accordingly, HARQ disabling has been agreed at the recent standardization meeting as follows.
[Table 11]

TABLE 11

Conclusion
RAN1 does not need to further discuss dynamic disabling of HARQ by gNB following the RAN2#107 decision stating the following
● The enabling / disabling of HARQ feedback should be configurable on a per UE and per HARQ process basis Hereinafter, effective HARQ enhancement methods are proposed.

Proposal 1.

In a system where a relatively large round trip delay (RTD) needs to be considered due to a large distance between the BS and UE such as an NTN, the BS may perform transmission based on PDSCH repetition (or slot aggregation) to improve the link reliability between the BS and UE. The transmission based on PDSCH repetition may mean a method of repeatedly transmitting a PDSCH to improve the link reliability between the BS and UE. In this case, the UE may report/request a minimum slot aggregation level (or recommended repetition number) (required for successful decoding of the PDSCH) to/from the BS.

When the UE reports/requests the minimum slot aggregation level or recommended repetition number to/from the BS, the UE may report the minimum slot aggregation level or recommended repetition number to the BS periodically/semi-periodically/aperiodically (e.g., similarly to CSI reporting). Thus, the BS may flexibly manage DL resources, and the UE may effectively manage the buffer.

According to the current NR specifications, the BS may semi-statically indicate which aggregation factor (e.g., pdsch-AggregationFactor in pdsch-config) the UE needs to use. If disabling of HARQ feedback is dynamically indicated/configured, repeated transmission of a PDSCH may also be dynamically configured, and an aggregation level may be dynamically indicated to flexibly indicate the PDSCH transmission. The configuration for the PDSCH repetition may be determined implicitly in association with enabling/disabling of HARQ feedback (e.g., in the case of HARQ disabling, the PDSCH repetition may be performed). The configuration for the PDSCH repetition may be explicitly indicated/configured by a separate indicator (e.g., a repetition enabler) in consideration of situations such as data traffic. For dynamic indication of the aggregation level/repetition factor, a separate indicator in a DCI field or time domain resource allocation (TDRA) may be used. When the aggregation level/repetition factor is indicated by the TDRA, the repeated transmission may be performed in slots spaced apart by a step size (e.g., 1, 2, or 4 slots/sub-slots/mini-slots) rather than consecutive slots at the level of the step size as shown in Table 12 for more flexible indication. Additionally/alternatively, a specific repetition pattern may be dynamically indicated.

TABLE 12

PDSCH-TimeDomainResourceAllocations-r16 ::= SEQUENCE (
  k0-r16                                        INTEGER(0..32)
OPTIONAL, -- Need S
  mappingType-r16                ENUMERATED (typeA, typeB),
  startSymbolAndLength-r16      INTEGER (0..127), TABLE 12-continued

| | |
|---|---|
| repetitionNumber-r16<br>n4, n5, n6, n7, n8, n16)<br>OPTIONAL, -- Cond Formats1-0and1-1 | ENUMERATED (n2, n3, |
| stepSize<br>n4... } | ENUMERATED {n1, n2, |
| repetitionPattern<br>A, type B}<br>...<br>} | ENUMERATED {type |

For example, in Proposal 1 described above, HARQ feedback may be configured/indicated only when HARQ feedback is disabled.

In current NR, up to 16 HARQ processes may be configured for each UE. In this case, if specific HARQ process IDs among the configured HARQ processes are disabled, the method of configuring a HARQ-ACK codebook may become ambiguous. Hereinafter, methods of effectively configuring a HARQ-ACK codebook when HARQ feedback is disabled will be described.

Proposal 2.

When HARQ feedback is disabled, the following method of configuring a HARQ-ACK codebook may be considered to reduce unnecessary overhead. Specifically, a method of configuring a HARQ-ACK codebook based on an enabled HARQ process among a plurality of HARQ processes will be described. The HARQ-ACK codebook may be referred to as a HARQ codebook in some embodiments. In addition, the above-described HARQ-ACK codebook determination may be referenced/used perform/understand Proposal 2.

1) For Type 1 HARQ-ACK Codebook (Semi-Static HARQ-ACK Codebook):

If all HARQ process IDs of a specific cell are disabled, the cell may be excluded when the Type 1 HARQ-ACK codebook is configured even though the corresponding cell is a configured cell. In this case, disabling of a HARQ process ID may be used as the same meaning as disabling of a HARQ process.

When the Type 1 HARQ-ACK codebook is configured, if only one HARQ process ID is enabled among the HARQ process IDs of a specific cell, a HARQ-ACK bit for one PDSCH may be allocated in the cell, and HARQ feedback for the enabled HARQ process may be performed.

If N (e.g., two or more) HARQ process IDs are enabled among the HARQ process IDs of a specific cell, an indicator (e.g., counter-DAI (C-DAI) and total-DAI (T-DAI)) indicating which cell and which HARQ cell the feedback is for may be introduced.

The above-described proposal for configuring the Type I HARQ-ACK codebook may be applied/configured only when enabling/disabling of HARQ feedback is semi-statically indicated.

The above-described proposal for configuring the Type I HARQ-ACK codebook may be applied/configured limitedly only to cells in which at least one HARQ ID is enabled.

When all or some of the HARQ IDs of a specific cell are semi-statically enabled or dynamically enabled/disabled, the corresponding cell may be regarded as a cell in which HARQ feedback is enabled so that the cell may be included in the Type 1 HARQ-ACK codebook configuration.

When all of the HARQ IDs of a specific cell are semi-statically disabled, the cell may be considered as a cell in which HARQ feedback is disabled so that the cell may not be included in the Type 1 HARQ-ACK codebook configuration (even though the cell is a configured cell).

2) For Type 2 HARQ-ACK Codebook (Dynamic HARQ-ACK Codebook):

According to the current NR specifications, for the Type 2 HARQ-ACK codebook, whether the T-DAI field is included in DL DCI may be determined depending on the number of carrier aggregated (CA) cells (i.e., the number of scheduled CCs) (for a single CC, only the C-DAI field exists). Depending on the maximum number of TBs or code block groups (CBGs) configured in each cell (which may be transmitted on a single PDSCH), ACK/NACK granularity (i.e., the number of ACK/NACK bits mapped to each PDSCH) and/or the number of UL DAI fields on the HARK-ACK codebook may be determined. In this case, determining the parameter values by including cells in which HARQ feedback is disabled may cause redundancy to DCI overhead and/or the HARQ-ACK codebook configuration. Therefore, when the HARQ-ACK codebook parameters are configured/determined, only a set of cells in which at least one HARQ process ID is (semi-statically) enabled or (dynamically) enabled may be considered rather than a set of all CA cells.

For a cell in which enabling/disabling of HARQ feedback is dynamically indicated, considering the reliability of the HARQ-ACK codebook, the HARQ-ACK codebook may be configured and related parameter values may be determined by regarding the corresponding cell as a cell in which the HARQ feedback is enabled.

When HARQ feedback enabling/disabling is configured with the concept of a HARQ process pool (for example, when one pool is a group of disabled HARQ processes and another pool is a group of enabled HARQ processes), the HARQ-ACK codebook may be configured and related parameter values may be determined only for cells including the enabled HARQ process group.

For example, a HARQ process pool may mean a set/group/pool of HARQ processes including one or more HARQ process IDs. Enabling/disabling of HARQ feedback may be configured for each HARQ process pool. For example, if a specific HARQ process pool is configured to be enabled, HARQ processes included in the enabled HARQ process pool may be enabled. Then, the HARQ-ACK codebook may be configured and related parameter values may be determined only for cells corresponding to the enabled HARQ process IDs.

For example, if one specific HARQ process pool is configured to be disabled only, the other HARQ process pool may comprise HARQ processes which may be enabled. The HARQ-ACK codebook may be configured and related parameter values may be determined only for cells corresponding to the HARQ process IDs included in the pool which may be enabled.

3) For Type 3 HARQ-ACK Codebook:

A Type 3 HARQ-ACK codebook based on HARQ process IDs has been additionally introduced in Rel-16 NR unlicensed bands (NR-U). When HARQ feedback is enabled/disabled (dynamically/semi-statically), it may be more appropriate to use the Type 3 HARQ-ACK codebook based on HARQ process IDs. In this case, similarly to the above proposals, the HARQ-ACK codebook may be configured and related parameter values may be determined only for HARQ process IDs that are enabled or expected to be enabled for each cell.

When HARQ feedback enabling/disabling is configured with the concept of a HARQ process pool (for example, when one pool is a group of disabled HARQ processes and another pool is a group of enabled HARQ processes), the HARQ-ACK codebook may be configured and related parameter values may be determined only for cells including the enabled HARQ process group.

For example, a HARQ process pool may mean a set/group/pool of HARQ processes with one or more HARQ process IDs. Enabling/disabling of HARQ feedback may be configured for each HARQ process pool. For example, if a specific HARQ process pool is configured to be enabled, HARQ processes included in the corresponding HARQ process pool may be enabled. Then, the HARQ-ACK codebook may be configured and related parameter values may be determined only for cells corresponding to the enabled HARQ process IDs.

For example, a HARQ process pool may mean a set/group/pool of HARQ processes with one or more HARQ process IDs. Enabling/disabling of HARQ feedback may be configured for each HARQ process pool. For example, if one specific HARQ process pool is disabled only, the other HARQ process pool may comprise HARQ processes which may be enabled. The HARQ-ACK codebook may be configured and related parameter values may be determined only for cells corresponding to the HARQ process IDs included in the corresponding pool which may be enabled.

As one example, when all or some of the HARQ IDs of a specific cell are semi-statically enabled or dynamically enabled/disabled, all HARQ process IDs of the corresponding cell may be included in the Type 3 HARQ-ACK codebook configuration. If all HARQ process IDs of the specific cell are semi-statically disabled, all the HARQ process IDs of the corresponding cell may not be included in the Type 3 HARQ-ACK codebook configuration.

As another example, when all or some of the HARQ process IDs of a specific cell are semi-statically enabled or dynamically enabled/disabled, only HARQ process IDs that are (semi-statically) enabled or capable of being (dynamically) enabled in the cell may be included in the Type 3 HARQ-ACK codebook configuration. When all or some of the HARQ process IDs of the specific cell are semi-statically disabled, the disabled HARQ process IDs of the corresponding cell may not be included in the Type 3 HARQ-ACK codebook configuration.

For a system in which a large RTT needs to be considered such as the NTN, increasing the number of HARQ processes by effectively using the large RTT is being discussed. In the NTN, the maximum RTT may be regarded as 541.46 ms, 25.77 ms, and 41.77 ms for geostationary earth orbit (GEO), low earth orbit (LEO) (600 km), and LEO (1200 km), respectively. Therefore, the number of HARQ processes may increase in proportion to the RTT in order to effectively use the large RTT. For example, assuming an SCS of 15 kHz, the number of HARQ processes needs to be increase to 542, 26, and 42 for GEO, LEO (600 km), and LEO (1200 km). When the number of HARQ processes increases based on LEO, it may be effective to increase the number of HARQ processes to 24/32/48/64. The BS may configure/indicate the corresponding value based on UE capability reporting. For example, the UE may report the number of supportable HARQ processes (e.g., the maximum number of supportable HARQ processes) to the BS as the UE capability, and the BS may configure the number of HARQ processes to the UE in consideration of the reported UE capability (within the capability of the UE). When the number of HARQ processes increases as described above, there may be a problem in that the size of a HARQ process ID field, which is indicated by (a maximum of) 4 bits of the current DCI field, also needs to increase. For non-fall back DCI, it may be natural to increase the size of the payload (increase the size of the field) (for example, the size increases to 5 or 6 bits), but for fall-back DCI (e.g., DCI 1_0), it may not be desirable to increase the size of the payload in terms of reliability. Therefore, when scheduling is performed with the fall-back DCI, it may be desirable to indicate a maximum of 16 HARQ processes (with up to 4 bits) as in the prior art.

When the number of HARQ processes increases, if the size of the HARQ process ID field of DCI is maintained at a maximum of 4 bits as in the prior art with no increase, it is necessary to eliminate ambiguity that is caused by indicating a larger number of HARQ processes with a small number of bits. Hereinafter, a method of solving the above-described problem will be described.

Proposal 3.

When the number of HARQ processes increases to 16 or more, and when the size of the HARQ process ID field of DCI for indicating an increase in the number of HARQ processes is fixed to 4 bits, a method of identifying each HARQ process ID based on a control channel element (CCE)/resource block (RB) index may be considered. In other words, each HARQ process ID may be identified based on the HARQ process number/ID field and the CCE/RB index of DCI. The CCE/RB may be related to DCI including the HARQ process ID. For example, the CCE/RB may be a CCE in which a PDCCH including the DCI is received or a specific RB of a PDSCH scheduled by the DCI.

Figure 13:
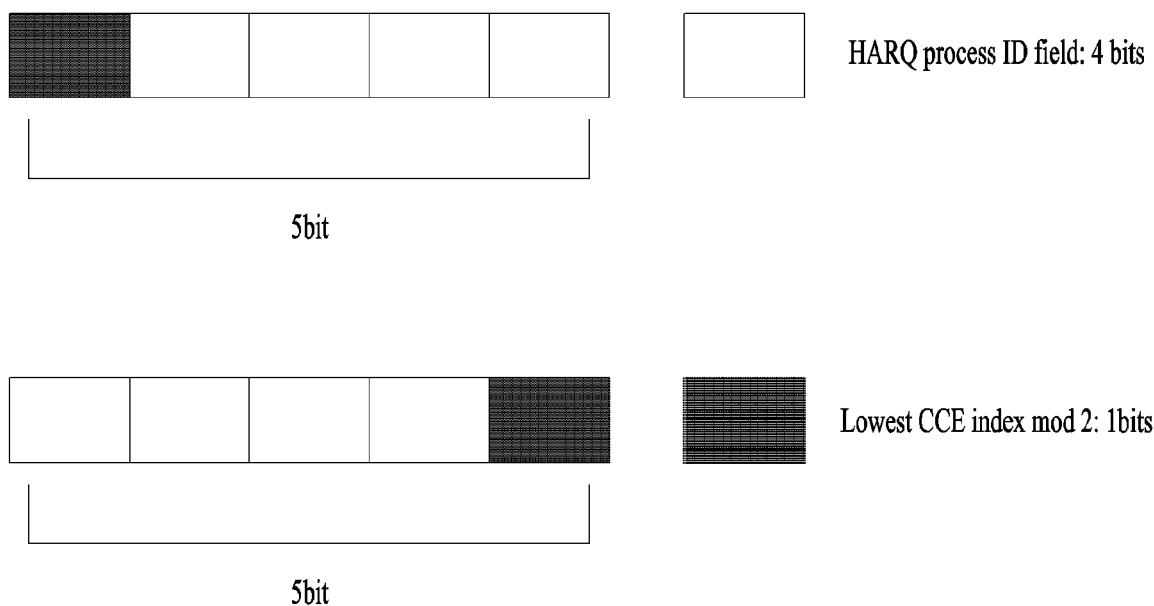
FIG. 13 is a diagram illustrating a method of identifying a HARQ process based on the lowest control channel element (CCE) index according to a proposed embodiment.

FIG. 13 is a diagram illustrating a method of identifying a HARQ process based on the lowest CCE index according to a proposed embodiment.

As an embodiment according to Proposal 3, when a HARQ process ID is identified based on a (lowest or highest) CCE index, a modulo operation may be performed on the (lowest or highest) CCE index related to DCI indicating a HARQ process, and the result of the modulo operation may be used to identify the HARQ process. For example, when the modulo 2 operation is performed on the (lowest or highest) CCE index, the result of the modulo operation may be 0 or 1, and the result of the modulo operation may be linked with the HARQ process ID field. If the number of HARQ processes increases to 32, 32 HARQ processes may be indicated by ((lowest CCE_index) mod 2)+HARQ process field as shown in FIG. 13. In this case, the result of the (CCE index mod 2) operation may be located at the beginning or end of a composite field. When the number of HARQ processes increases to 64, the modulo operation level may increase from 2 to 4, and the above method may be applied as it is by binarizing the result of the modulo operation. For example, when the CCE index is 6, the result of the modulo 4 operation is 2. If 2 is binarized, it becomes 01. As shown in FIG. 13, if '01' is located at the beginning or end of composite bits, 64 HARQ processes may be identified. The above-described binarization may vary depending on embodiments. For example, the binarization may be determined as 0:00/1:01/2:10/3:11. In contrast, the binarization may be determined as 3:00/2:01/1:10/0:11.

In Proposal 3, if a HARQ process is identified based on an RB index, a value obtained by the modulo operation on a specific RB index of a PDSCH scheduling by DCI including a HARQ process ID (e.g., lowest RB index or highest RB index) may be located at the beginning or end of composite bits in order to identify the HARQ process.

The maximum number of HARQ processes has been agreed at the standardization meeting as shown in Table 13 below.

TABLE 13

Agreement:
The extension of maximal HARQ process number can be considered with following assumptions:
- The maximal supported HARQ process number is up to 32.
- FFS: Support on the maximal HARQ process number is up to UE capability
Minimizing the impacts on specification and scheduling Referring to Table 13, the number of HARQ processes may increase up to 32 in the Rel-17 NTN. In Proposal 3, it is proposed to extend the HARQ process ID field based on an increase in the number of HARQ processes. Accordingly, extending the range of K1 values (e.g., from 0 to 31) may also be considered. Alternatively, in order for the network to fully utilize contiguous DL slots for PDSCH transmission to one or more UEs, that is, for network configuration/scheduling flexibility, it may be considered to extend the range of K1 values. That is, this method may be effectively applied to a plurality of UEs without introducing K_offset that covers the RTD between the UE and BS in an air-to-ground scenario or a high altitude platform station (HAPS) scenario, where K_offset may be an offset different from K1_offset, which will be described later. K_offset has been agreed at the standardization meeting as shown in Table 14 below.

TABLE 14

Agreement:
- Introduce K_offset to enhance the following timing relationships:
  ○ The transmission timing of DCI scheduled PUSCH (including CSI on PUSCH).
  ○ The transmission timing of RAR grant scheduled PUSCH.
  ○ The transmission timing of HARQ-ACK on PUCCH.
  ○ The CSI reference resource timing.
  ○ The transmission timing of aperiodic SRS.
- Note: Additional timing relationships that require K_offset of the same or different values can be further identified.

In order to effectively support the two use cases, a method of indicating the K1 value will be proposed below.

Before description of Proposal 4, the range of K1 values may be determined as follows according to TS 38.213, TS 38.212, etc. For example, the current range of K1 values may be determined based on a PDSCH-to-HARQ_feedback timing indicator field of a higher layer parameter "dl-DataToUL-ACK" (for example, up to 8 values from 0 to 15 of the List of timing for given PDSCH to the DL ACK may be indicated) and/or a PDSCH-to-HARQ feedback timing indicator field of DCI (the bitwidth of the PDSCH-to-HARQ_feedback timing indicator is determined as $\lceil \log_2(I) \rceil$ bits, where I denotes the number of entries included in the high layer parameter dl-DataToUL-ACK).

Table 15 below shows a mapping relationship between a PDSCH-to-HARQ feedback timing indicator field value of DCI and the value of K1 (e.g., the number of slots).

TABLE 15

| PDSCH-to-HARQ_ feedback timing indicator | | | |
|---|---|---|---|
| 1 bit | 2 bits | 3 bits | Number of slots k |
| '0' | '00' | '000' | $1^{st}$ value provided by dl-DataToUL-ACK or by dl-DataToUL-ACKForDCIFormat1_2 |
| '1' | '01' | '001' | $2^{nd}$ value provided by dl-DataToUL-ACK or by dl-DataToUL-ACKForDCIFormat1_2 |

TABLE 15-continued

| PDSCH-to-HARQ_ feedback timing indicator | | | |
|---|---|---|---|
| 1 bit | 2 bits | 3 bits | Number of slots k |
| | '10' | '010' | $3^{rd}$ value provided by dl-DataToUL-ACK or by dl-DataToUL-ACKForDCIFormat1_2 |
| | '11' | '011' | $4^{th}$ value provided by dl-DataToUL-ACK or by dl-DataToUL-ACKForDCIFormat1_2 |
| | | '100' | $5^{th}$ value provided by dl-DataToUL-ACK or |

TABLE 15-continued

| PDSCH-to-HARQ_ feedback timing indicator | | | |
|---|---|---|---|
| 1 bit | 2 bits | 3 bits | Number of slots k |
| | | | by dl-DateToUL-ACKForDCIFormat1_2 |
| | | '101' | $6^{th}$ value provided by dl-DataToUL-ACK or by dl-DataToUL-ACKForDCIFormat1_2 |
| | | '110' | $7^{th}$ value provided by dl-DataToUL-ACK or by dl-DataToUL-ACKForDCIFormat1_2 |
| | | '111' | $8^{th}$ value provided by dl-DataToUL-ACK or by dl-DataToUL-ACKForDCIFormat1_2 |

Proposal 4.

K1 may be indicated by a K1 field of DCI. According to Proposal 4, an extended range of K1 values may be indicated by implicitly adding X bits (e.g., X=1 or 2) while maintaining the current number of bits (e.g., a maximum of 3 bits) without extension of the PDSCH-to-HARQ_feedback timing indicator (e.g., extension to 4 or 5 bits). The implicit indication method may include the following embodiments.

1) Alt 1

A. In both non-fallback DCI and fallback DCI, K1_offset may be indicated by implicitly adding 1 bit without an increase in the size of the K1 field. In the above example, K1_offset becomes 1. The implicit K1 indication may be determined based on a slot index or system frame number (SFN). For example, in the case of an even slot index, the K1_offset value may be determined to be 0, and in the case of an odd slot index, the K1_offset value may be determined to be 1. In other words, the K1 value may be determined based on a value indicated by bits obtained by combining the bits of the K1 field and the implicit K1_offset indication.

B. As another embodiment of Alt 1, the K1 value may be determined based on the lowest/highest CCE index of a PDCCH carrying DCI or the lowest/highest index of a PDSCH scheduled by the corresponding DCI as in Proposal 3. That is, K1_offset may correspond to i) the lowest/highest CCE index of the PDCCH carrying the DCI or ii) the lowest/highest index of the PDSCH scheduled by the corresponding DCI in Proposal 3 described above. In this case, the slot index may be a slot index in which the PDCCH carrying the corresponding DCI is detected or a specific index of the PDSCH scheduled by the DCI (e.g., the starting index of the PDSCH).

C. In Case A, an implicitly obtained 1 bit may be finally located as the LSB when K1 is indicated. That is, Case A corresponds to the second case shown in FIG. 13. Similarly, a case in which an implicit 1 bit is located as the MSB may also be considered as shown in the first case of FIG. 13. In this case, K1_offset becomes 16. That is, when the slot index is from 0 to 15, K1 offset is 0, and when the slot index is from 16 to 31, K1_offset is 16. The aforementioned K1_offset value is an example of when there are 32 HARQ processes, and the K1_offset value may vary as the number of candidate K1 values increases or the number of HARQ processes increases. Alternatively, the K1_offset value may be a value configured by the BS or a value previously agreed between the BS and UE.

2) Alt 2

For non-fallback DCI, the size of a K field may increase (e.g., the size may increase to 5 bits). However, for fallback DCI, an implicit K offset may be applied without increasing the size of the K1 field. In this case, the implicit K offset may be applied according to Alt 1.

3) Alt 3

For both non-fallback DCI and fallback DCI, the size of the K field may not increase. However, an implicit K1 offset may be applied for non-fallback DCI, but no implicit K1 offset may be applied for fallback DCI. Only a value indicated by the K1 field (e.g., 3 bits) may be used as in the prior art. In this case, the implicit K1 offset may be applied according to Alt 1.

In Proposal 4, an implicit indicator may be used to indicate K1. However, the implicit indicator may be used to indicate a HARQ process ID as in Proposal 3. Accordingly, the implicit indicator may be commonly applied to indicate the HARQ process ID and K1. That is, one implicit bit (one bit obtained according to Proposal 4 above) may be located as the MSB or LSB to indicate the HARQ process ID and K1. Alternatively, in another embodiment, the HARQ process ID and K1 may be indicated by increasing the modulo operation level in the implicit method of Proposal 3 or 4. For example, values of 0, 1, 2, and 3 may be obtained by applying the modulo 4 operation to the slot index rather than the modulo 2 operation, and the obtained value may be jointly used to indicate the HARQ process ID and K1. For example, referring to Table 16, 0, 1, 2, and 3 obtained by applying the modulo 4 operation to the slot index may be binarized, and the MSB/LSB of the binarized bits may be mapped to the HARQ process ID and K1 indicator, respectively (and vice versa) in order to indicate the HARQ process ID and K1.

TABLE 16

| | HARQ process id (or K1 indicator) | K1 indicator (or HARQ process id) |
|---|---|---|
| 0 (00) | 0 | 0 |
| 1 (01) | 0 | 1 |
| 2 (10) | 1 | 0 |
| 3 (11) | 1 | 1 |

When the HARQ process ID and K1 are commonly indicated, a 1-bit or 2-bit combination indicator may be separately defined within the DCI field, and the combination indicator may be combined with one or more specified fields. In this case, all or some of the bits of the combination indicator may be located as the MSB or LSB of the last indication bits (e.g., 5 bits of K1 or HARQ process ID indicator) (in some cases, as shown in Table 15). For example, a 1-bit indicator may be defined and used in common for the K1 field and/or the HARQ process ID field. In addition, the 1-bit indicator may be located as the MSB or LSB.

HARQ codebook enhancement has been agreed at the standardization meeting as shown in Table 17 below.

TABLE 17

Agreement:
HARQ codebook enhancement is supported as:
● For Type-2 HARQ codebook:
  ○ Option-1: Reduce codebook size with:
    ■ HARQ-ACK codebook only includes HARQ-ACK of PDSCH with feedback-enabled HARQ processes
      ● FFS: the details of C-DAI and T-DAI counting for DCI of PDSCH with feedback-enable/disabled. HARQ processes
    ■ FFS: at least DCI for SPS release/SPS PDSCH
  ○ Option-2: No enhancement
  ○ Other options are not precluded.

In the Type 1, 2, and 3 HARQ-ACK codebooks, when DCI scheduling a PDSCH indicates a disabled HARQ process, even if a specific field (e.g., K1, PUCCH Resource Indicator (PRI), etc.) exists, the UE may not read the field (or may ignore the field). Alternatively, when the disabled HARQ process is indicated, compact DCI may be configured without the specific field. If the HARQ-ACK codebook configuration consists of only enabled HARQ processes, the ACK/NACK for a disabled HARQ process may be excluded from the codebook configuration. For the legacy Type 1 HARQ-ACK codebook, the size of the semi-statically set codebook may be determined (including disabled HARQ processes). The HARQ-ACK for the disabled HARQ process may be reported as a NACK because there is no information about the parameter (K1 and PRI) and/or start and length indicator value (SLIV) related to HARQ feedback in DCI.

In particular, various candidates have been discussed for the Type 2 HARQ codebook. Table 18 below shows the candidates discussed.

TABLE 18

1) Alt-1: C-DAT and T-DAT count only PDSCH with feedback-enabled HARQ processes.
  - In the DCI of PDSCH with feedback-enabled HARQ processes, the C-DAI and T-DAI are given their true values (i.e., the count of feedback-enabled processes)
  In the DCI of PDSCH with feedback disabled HARQ processes, the C DAI and T-DAI are given their true values (i.e., the count of feedback-enabled processes), despite they are not incremented.
2) Alt-2: C-DAI and T-DAI count only PDSCH with feedback-enabled HARQ processes.
  - In the DCI of PDSCH with feedback-enabled HARQ processes, the C-DAI and T-DAI are given their true values (i.e., the count of feedback-enabled processes)
  - In the DCI of PDSCH with feedback-disabled HARQ processes, the C-DAI and T-DAI are given a reserved value that was be ignored by the UE
  3) Alt-3: HARQ-ACK codebook only includes HARQ-ACK of enabled PDSCH
  - C-DAI/T-DAI value in DCI scheduling enabled PDSCH is counted for enabled PDSCH
  - C-DAI/T-DAI value in DCI scheduling disabled PDSCH is counted for disabled PDSCH
4) Alt-4: C-DAI and T-DAI count only PDSCH with feedback-enabled HARQ processes.
  - In the DCI of PDSCH with feedback-enabled HARQ processes, the C-DAI and T-DAI are given their true values (i.e., the count of feedback-enabled processes)
  5) Alt-5: Other alternatives are not precluded If a disabled HARQ process ID is first configured/indicated for the Type 2 HARQ-ACK codebook as in Alt 1 among the alternatives, or if the HARQ-ACK codebook consists of only disabled HARQ process IDs, the UE may have ambiguity in receiving/interpreting the C-DAI and t-DAI. Hereinafter, a method of solving the above-described problem will be described.

Proposal 5.

When HARQ feedback includes a disabled HARQ process ID, and more particularly, when the disabled HARQ process ID is configured first or when only the disabled HARQ process ID is configured, the UE may operate according to the following embodiment.

1) The UE may not read or may ignore the C-DAI value of DCI scheduled for the disabled HARQ process ID. When the UE configures a HARQ-ACK codebook, the UE may omit the ACK/NACK feedback on the disabled HARQ process ID.

2) The UE may read the C-DAI value of the DCI scheduled for the disabled HARQ process ID.

A. The initial value of the C-DAI may be set to 0 (considering the modular operation (2 bits→modulo 4), the C-DAI may be indicated as 4 by the DCI field.)

For example, if DCI with a C-DAI value of 4 is received, and if there is an enabled HARQ process ID received before the reception of the DCI, the UE may interpret the C-DAI value as 4. If there is no enabled HARQ process ID received before the reception of the DCI, the UE may interpret the C-DAI value as 0 and omit the ACK/NACK feedback on the corresponding HARQ process ID.

If HARQ process IDs configured/indicated for the Type 2 HARQ-ACK codebook starts with a disabled HARQ process ID, the UE may interpret the C-DAI value as 0. For example, if enabling/disabling of HARQ feedback for 7 HARQ process IDs indicated for the Type 2 HARQ-ACK codebook is set to {disabled, disabled, disabled, enabled, enabled, disabled, disabled}, the UE may interpret the C-DAI value as 0-0-0-1-2-2-2.

B. When the initial value of the C-DAI is set to 1, and when the T-DAI value is 1 because the UE receives only a disabled HARQ process ID, the UE may omit ACK/NACK feedback.

For example, when the UE receives HARQ process IDs set to {disabled, disabled, disabled}, that is, when the C-DAI value is {1, 1, 1} and the T-DAI value is 1, the UE may omit ACK/NACK feedback for the corresponding Type 2 HARQ-ACK codebook because there is no received enabled HARQ process ID.

Alternatively, when the UE receives HARQ process IDs set to {disabled, disabled, enabled}, that is, when the C-DAI value is {1, 1, 1} and the T-DAI value is 1, the UE may set the ACK/NACK codebook size of the Type 2 HARQ-ACK codebook to 1 bit and report the ACK/NACK codebook size to the BS because an enabled HARQ process ID is received C. When HARQ process IDs starts with an enabled HARQ process ID, the UE may set the C-DAI value to 2. When HARQ process IDs starts with a disabled HARQ process ID, the UE may set the C-DAI value to 1 or invalid. Then, the UE may configure the Type 2 HARQ-ACK codebook by setting the size of the final codebook to (T-DAI value)−1 and perform feedback to the BS.

D. When the UE receives only a disabled HARQ process ID, but when the C-DAI/T-DAI value is not the initial value (e.g., 2), the UE may omit ACK/NACK feedback based on the Type 2 HARQ-ACK codebook.

Alternatively, the UE may report a NACK for the codebook size corresponding to the T-DAI value (i.e., 2-bit codebook in the above embodiment) to the BS. In the above embodiment, the UE may report {NACK, NACK} to the BS.

E. For the C-DAI value of a disabled HARQ process ID, the last C-DAI value of a "signaled" enabled HARQ process ID may be maintained. In this case, if there is no enabled HARQ process ID scheduled, the UE may ignore the C-DAI in DCI scheduling the disabled HARQ process ID. Therefore, since there is no valid C-DAI, the UE may omit ACK/NACK feedback therefor.

In the above example of {disabled, disabled, disabled, enabled, enabled, disabled, disabled}, the UE may interpret the C-DAI value configured/indicated by the BS as invalid-invalid-invalid-1-2-2-2.

For a UL-DAI indicated by a DAI field in a UL grant PDCCH (information on the number of scheduled PDCCHs indicated by 2 bits), the principle of Proposal 5 may be equally applied. For example, when the UE receives DL DCI scheduling a DL signal, but when all HARQ process IDs are disabled or when the UE does not receive DL DCI related to enabled HARQ process IDs, if a UL-DAI value indicated by the UL grant PDCCH is 4, 0, or invalid, the UE may not perform HARQ feedback. Specifically, when a PUCCH resource for HARQ feedback overlaps with a PUSCH resource in the time domain, the corresponding PUCCH resource may be piggybacked on the PUSCH resource. In this case, if the UL-DAI value is 4, 0, or invalid, the UE may not piggyback HARQ-ACK information on the PUSCH.

(In Proposal 2 and/or 4 above), a PUCCH resource used for HARQ-ACK transmission in a specific slot may be determined based on a PRI indicated by the last received DCI among DCIs indicating the corresponding slot as the HARQ-ACK timing (K1) and enabled HARQ process IDs.

Figure 14:
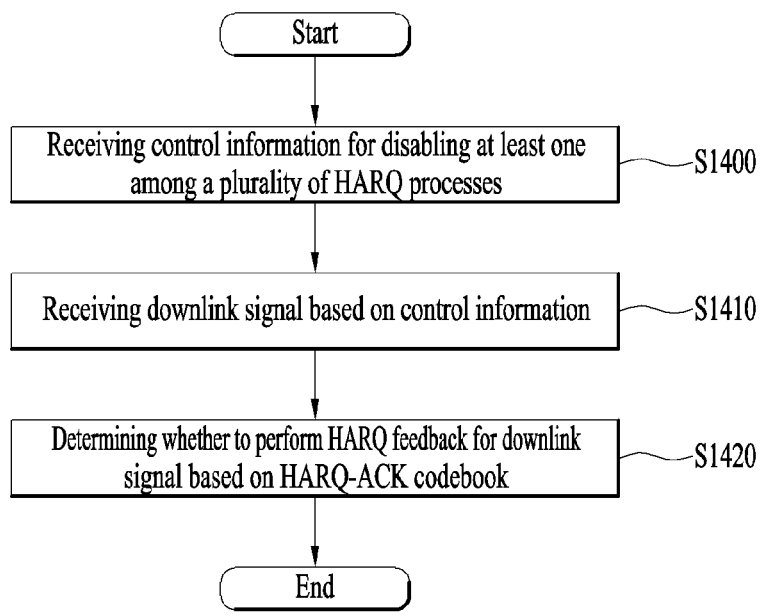
FIG. 14 is a flowchart illustrating operations of a UE according to proposed embodiments.

FIG. 14 is a flowchart illustrating operations of a UE according to proposed embodiments.

Referring to FIG. 14, the UE may receive control information for disabling at least one of a plurality of HARQ processes according to an embodiment (S1400). In the NTN, HARQ-ACK feedback may be disabled in order to solve a latency problem due to a relatively large RTT (or RTD). In this case, at least one of a plurality of HARQ processes configured for HARQ-ACK feedback may be disabled, and disabling of the at least one HARQ process may be configured semi-statically or dynamically.

The UE may receive a DL signal based on the control information (S1410). In general, the UE may perform HARQ-ACK feedback for the received DL signal. However, when the at least one HARQ process is disabled, the HARQ-ACK feedback may be performed differently. Specifically, a HARQ-ACK codebook may be determined differently from a case in which the plurality of HARQ processes are all enabled. For example, the HARQ-ACK codebook may be determined based on enabled HARQ processes rather than all of the plurality of HARQ processes. In addition, the at least one disabled HARQ process may be excluded from determination of the HARQ-ACK codebook. In this case, the enabled HARQ processes may be determined based on the control information for disabling the at least one HARQ process among the plurality of HARQ processes. For example, the enabled HARQ processes may include the remaining HARQ processes except for the at least one HARQ process disabled based on the control information among the plurality of HARQ processes. For example, the UE may ignore a C-DAI value in DCI indicating the at least one disabled HARQ process.

The UE may determine whether to perform the HARQ-ACK feedback for the received DL signal based on the determined HARQ-ACK codebook (S1420).

When the UE is configured with a plurality of cells, a plurality of HARQ processes may be configured for each of the plurality of cells. In this case, the control information for disabling the at least one of the plurality of HARQ processes may be control information for disabling at least one of a plurality of HARQ processes configured for a specific cell. For example, when the plurality of HARQ processes configured for the specific cell are all disabled, the UE may determine the HARQ-ACK codebook by excluding the corresponding cell. In other words, the HARQ-ACK codebook may be determined based on cells in which at least one HARQ process is enabled. Alternatively, when only one of the plurality of HARQ processes configured for the specific cell is enabled, HARQ-ACK bit(s) for one DL signal (e.g., PDSCH) may be allocated in the corresponding cell, and the HARQ-ACK feedback may be performed for the enabled HARQ process.

As described above, considering that the UE requires a time for processing the received DL signal when performing the HARQ-ACK feedback, a timing offset (e.g., "PDSCH-to-HARQ feedback timing indicator") for performing the HARQ-ACK feedback may be configured. In the NTN, the number of HARQ processes may increase in consideration of the relatively large RTT, and thus, the range of the timing offset value may extend. When the range of the timing offset value extends, a method of indicating the extended range of the timing offset value is needed. The timing offset value may be indicated to the UE by a specific field (e.g., K1 field) of DCI. However, when the range of the timing offset value extends, a larger number of bits than before may be required to indicate the extended range of the timing offset value. In the case of fallback DCI, it may not be easy to increase the size of the specific field. According to the proposed embodiment, a value determined based on a resource index may be used in addition to the specific field of the DCI. The value determined based on the resource index may correspond to the implicit K1 indicator in Proposal 4 described above. In this case, the resource index may include a CCE index in which a PDCCH including the DCI is transmitted, a slot index in which the PDCCH is detected, or an RB index in which a PDSCH scheduled by the DCI is transmitted, but the present disclosure is not limited thereto. For example, the CCE index in which the PDCCH is transmitted may mean the lowest or highest index among CCE indices in which the PDCCH is transmitted, and the RB index in which the PDSCH is transmitted may mean the starting RB index among RB indices in which the PDSCH is transmitted. However, the present disclosure is not limited thereto.

The value determined based on the resource index may be implicitly used as an additionally necessary bit for indicating the extended range of the timing offset. For example, when a slot index is used, the value determined based on the resource index may be '0' in the case of an even slot index or '1' in the case of an odd slot index, but the present disclosure is not limited thereto.

According to the proposed embodiments, when the HARQ-ACK feedback is disabled, the HARQ-ACK codebook may be configured more efficiently, thereby reducing unnecessary overhead. In addition, according to the proposed embodiments, in the NTN, when the number of HARQ processes increases or when the range of a timing offset value for performing HARQ-ACK feedback extends, an increase in the number of HARQ processes or the timing offset value may be indicated implicitly without increasing the size of a DCI field.

It is obvious that each of the examples of the proposed methods may also be included as one implementation method, and thus each of the examples may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from the BS to the UE in a predefined signal (e.g., a physical layer signal, a higher layer signal, etc.). Higher layers may include, for example, at least one of the following functional layers: MAC, RLC, PDCP, RRC, and SDAP.

Methods, embodiments, or details for implementing the methods proposed in this specification (e.g., Proposal 1, Proposal 2, Proposal 3, Proposal 4, and Proposal 5) may be applied independently. Alternatively, at least one of the methods (embodiments or details) may be applied in combination.

Figure 15:
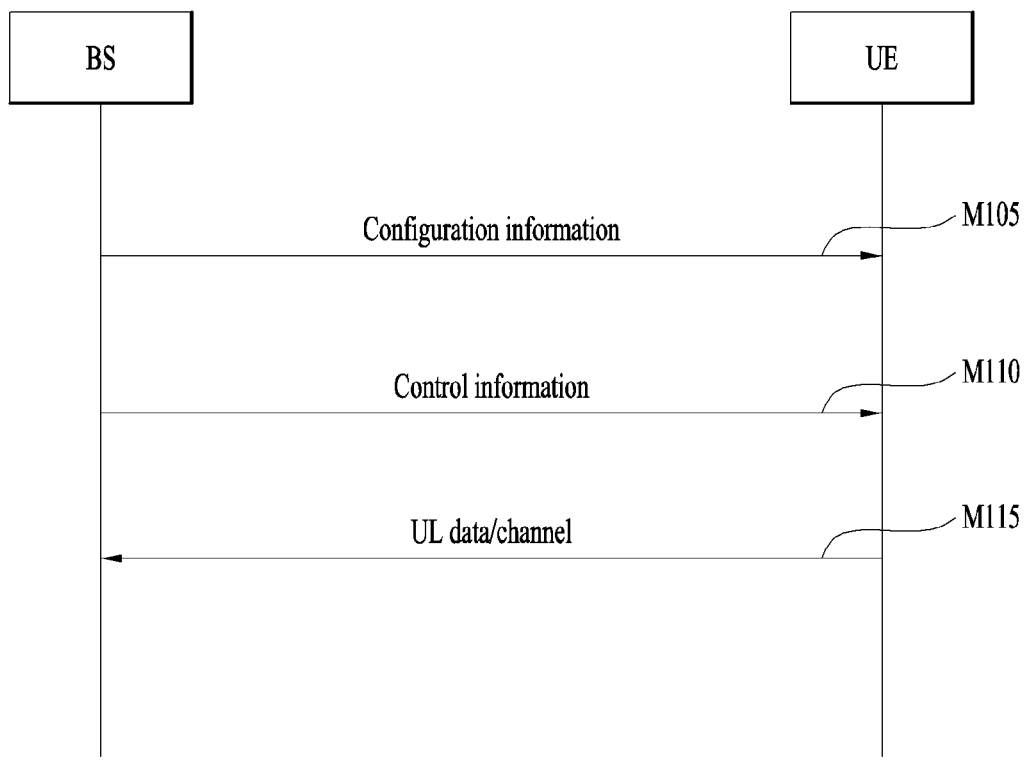
FIG. 15 is a flowchart illustrating operations of transmitting and receiving a UL signal between a BS and a UE according to proposed embodiments.
Figure 16:
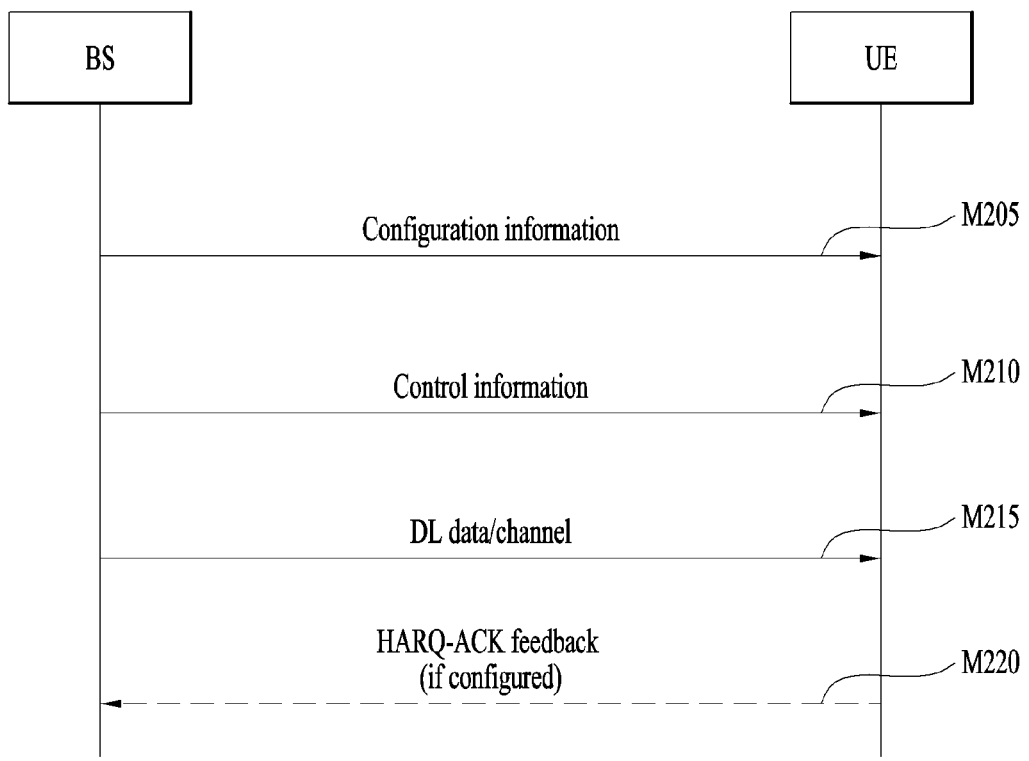
FIG. 16 is a flowchart illustrating operations of transmitting and receiving a DL signal between a BS and a UE according to proposed embodiments.

FIG. 15 is a flowchart illustrating operations of transmitting and receiving a UL signal between a BS and a UE according to the proposed embodiments, and FIG. 16 is a flowchart illustrating operations of transmitting and receiving a DL signal between a BS and a UE according to the proposed embodiments.

Here, the UE and BS are merely examples, and the UE and BS may be replaced with various devices. In addition, FIGS. 15 and 16 are only for convenience of description, and the scope of the present disclosure is not limited to FIGS. 15 and 16. Some of the steps shown in FIGS. 15 and 16 may be omitted/merged depending on situations and/or configurations.

In this document, the BS may refer to an object that performs data transmission/reception with the UE. For example, the BS may conceptually include one or more transmission points (TPs), one or more transmission and reception points (TRPs), and the like. The TP and/or TRP may include a panel or a transmission and reception unit of the BS. In addition, the term "TRP" may be replaced with the following terms: panel, antenna array, cell (e.g., macro cell, small cell, pico cell, etc.), TP, and BS (gNB, etc.). As described above, the TRP may be identified based on information (e.g., index or ID) on a CORESET group (or CORESET pool). For example, when one UE is configured to perform transmission and reception with a plurality of TRPs (or cells), it may mean that a plurality of CORESET groups (or CORESET pools) are configured for the UE. The configuration of the CORESET group (or CORESET pool) may be performed through higher layer signaling (e.g., RRC signaling, etc.).

Hereinafter, a UL signal transmission/reception operation between the UE and BS will be described in detail with reference to FIG. 15.

Although not shown in FIG. 15, a default HARQ operation mode of the UE may be configured in a step before the RRC connection/configuration as described in the proposed methods (e.g., Proposal 1, Proposal 2, Proposal 3, Proposal 4, and Proposal 5). For example, if the cell accessed by the UE is indicated as an NTN cell over a PBCH (MIB) or an SIB, the UE may recognize that the default mode is set to a HARQ-disabled mode. For example, one of a HARQ-disabled configuration and HARQ-enabled configuration(s) may be indicated as the default operation mode over the PBCH (MIB) or SIB (for example, when the cell is indicated as the NTN cell).

In addition, although not shown in FIG. 15, the UE may report to the BS information on UE capability related to the proposed methods (e.g., Proposal 1, Proposal 2, Proposal 3, Proposal 4, and Proposal 5). For example, the UE capability information may include information on the number of times of channel (e.g., PDSCH) repetitions supportable/recommended for the UE, information on a slot aggregation level, and/or information on the number of supported HARQ processes. For example, the UE capability information may be reported periodically/semi-persistently/aperiodically. The BS may configure/indicate the operations to be described below in consideration of the UE capability.

The BS may transmit configuration information to the UE (M105). That is, the UE may receive the configuration information from the BS. For example, the configuration information may include: NTN related configuration information described in the proposed methods (e.g., Proposal 1, Proposal 2, Proposal 3, Proposal 4, and Proposal 5); configuration information for UL transmission and reception (e.g., PUCCH-config, PUSCH-config, etc.); HARQ process related configurations (e.g., enabling/disabling of HARQ feedback, the number of HARQ processes, etc.); and/or CSI report related configurations (e.g., CSI report config, CSI report quantity, CSI-RS resource config, etc.). For example, the configuration information may be transmitted through higher layer signaling (RRC or MAC CE). For example, the HARQ feedback enabling/disabling may be configured for each cell group. For example, the HARQ feedback enabling/disabling may be configured by information in the form of a bitmap.

For example, the configuration information may include an aggregation factor and/or a PDSCH repetition related configuration (e.g., the number of repetitions, a repetition pattern, a repetition step size, etc.). For example, the operation in which the BS (100/200 in FIG. 18) transmits the configuration information to the UE (100/200 in FIGS. 18 to 20) in step M105 may be performed by devices of FIGS. 18 to 20, which will be described later. For example, referring to FIG. 18, one or more processors 102 may control one or more transceivers 106 and/or one or more memories 104 to transmit the configuration information, and the one or more transceivers 106 may transmit the configuration information to the UE.

For example, the operation in which the UE (100/200 in FIG. 18) receives the configuration information from the BS (100/200 in FIG. 18) in step M105 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

The BS may transmit the configuration information to the UE (M110). That is, the UE may receive the configuration information from the BS. For example, the configuration information may be transmitted/received in DCI. For example, the configuration information may include UL data, control information for channel transmission/reception, scheduling information, resource allocation information, and HARQ feedback related information (e.g., a new data indicator (NDI), a redundancy version (RV), the number of HARQ processes, a downlink assignment index (DAI), a transmit power control (TPC) command for a scheduled PUCCH, a PUCCH resource indicator, a PDSCH-to-HARQ_feedback timing indicator, etc.). For example, the DCI may be one of DCI format 1_0 or DCI format 1_1.

For example, whether the HARQ feedback is enabled or disabled may be configured based on the DCI. For example, whether the HARQ feedback is enabled or disabled may be configured based on the PDSCH-to-HARQ_feedback timing indicator field and/or PUCCH resource indicator field of the DCI. For example, the DCI may include an aggregation level (and/or repetition factor). For example, the number of HARQ processes may be set to 16 or more, and the 16 or more HARQ process IDs may be identified based on the HARQ process number field of the DCI and the index of a CCE/RB associated with the DCI.

For example, the operation in which the BS (100/200 in FIG. 18) transmits the configuration information to the UE (100/200 in FIG. 18) in step M110 may be performed by the devices of FIGS. 18 to 20 to be described below. For example, referring to FIG. 18, the one or more processors 102 may control the one or more transceivers 106 and/or one or more memories 104 to transmit the configuration information, and the one or more transceivers 106 may transmit the configuration information to the UE.

For example, the operation in which the UE (100/200 in FIG. 18) receives the configuration information from the BS (100/200 in FIG. 18) in step M110 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

The BS may receive UL data/channels (e.g., PUCCH/PUSCH) from the UE (M115). That is, the UE may transmit the UL data/channels to the BS. For example, the UL data/channels may be received/transmitted based on the aforementioned configuration information/control information. For example, the UL data/channels may be received/transmitted according to the proposed method (e.g., Proposal 1, Proposal 2, Proposal 3, and Proposal 4). For example, CSI reporting may be performed over the UL data/channels. The CSI reporting may include transmitting information such as RSRP/CQI/SINR/CRI to the BS. For example, the UL data/channels may include a UE request/report related to the HARQ feedback enabling/disabling. For example, as described in the proposed methods, the UE may report/request the HARQ feedback enabling/disabling based on a report on an increase/decrease in the MCS and a report on an increase/decrease in the number of PDSCH repetitions. For example, the UL data/channels may include HARQ-ACK information. For example, a HARQ-ACK codebook (e.g., Type 1/2/3) may be configured according to Proposal 2 described above. For example, when the HARQ-ACK information is transmitted over the UL data/channels, a timing for transmitting the HARQ-ACK information may be determined according to Proposal 4 described above.

For example, the operation in which the BS (100/200 in FIG. 18) receives the UL data/channels from the UE (100/200 in FIGS. 18 to 20) in step M115 may be performed by the devices shown in FIGS. 18 to 20 to be described below. For example, referring to FIG. 18, the one or more processors 102 may control the one or more transceivers 106 and/or one or more memories 104 to receive the UL data/channels, and the one or more transceivers 106 may receive the UL data/channels from the UE.

For example, the operation in which the UE (100/200 in FIG. 18) transmits the UL data/channels to the BS (100/200 in FIGS. 18 to 20) in step M115 may be performed by the devices shown in FIGS. 18 to 20 to be described below. For example, referring to FIG. 18, the one or more processors 102 may control the one or more transceivers 106 and/or one or more memories 104 to transmit the UL data/channels, and the one or more transceivers 106 may transmit the UL data/channels to the BS.

Hereinafter, a DL data/channel transmission/reception operation between the UE and BS according to an embodiment will be described in detail with reference to FIG. 16.

Although not shown in FIG. 16, a default HARQ operation mode of the UE may be configured in a step before the RRC connection/configuration as described in the proposed methods (e.g., Proposal 1, Proposal 2, Proposal 3, Proposal 4, and Proposal 5). For example, if the cell accessed by the UE is indicated as an NTN cell over a PBCH (MIB) or an SIB, the UE may recognize that the default mode is set to a HARQ-disabled mode. For example, the BS may indicate one of a HARQ-disabled configuration and HARQ-enabled configuration(s) as the default operation mode over the PBCH (MIB) or SIB (for example, when the cell is indicated as the NTN cell).

In addition, although not shown in FIG. 16, the UE may report to the BS information on UE capability related to the proposed methods (e.g., Proposal 1, Proposal 2, Proposal 3, Proposal 4, and Proposal 5). For example, the UE capability information may include information on the number of times of channel (e.g., PDSCH) repetitions supportable/recommended for the UE, information on a slot aggregation level, and/or information on the number of supported HARQ processes. For example, the UE capability information may be reported periodically/semi-persistently/aperiodically. The BS may configure/indicate the operations to be described below in consideration of the UE capability.

The BS may transmit configuration information to the UE (M205). That is, the UE may receive the configuration information from the BS. For example, the configuration information may include: NTN related configuration information described in the proposed methods (e.g., Proposal 1, Proposal 2, Proposal 3, Proposal 4, and Proposal 5); configuration information for DL transmission and reception (e.g., PDCCH-config, PDSCH-config, etc.); HARQ process related configurations (e.g., enabling/disabling of HARQ feedback, the number of HARQ processes, etc.); and/or CSI report related configurations (e.g., CSI report config, CSI report quantity, CSI-RS resource config, etc.). For example, the configuration information may be transmitted through higher layer signaling (RRC or MAC CE). For example, the HARQ feedback enabling/disabling may be configured for each cell group. For example, the HARQ feedback enabling/disabling may be configured by information in the form of a bitmap. For example, the configuration information may include an aggregation factor, a PDSCH repetition related configuration (e.g., the number of repetitions, a repetition pattern, a repetition step size, etc.). For example, the configuration information may include a parameter dl-DataToUL-ACK. For example, multiple integers from 0 to 31 may be indicated based on the parameter dl-DataToUL-ACK.

For example, the operation in which the BS (100/200 in FIG. 18) transmits the configuration information to the UE (100/200 in FIGS. 18 to 20) in step M205 may be performed by the devices of FIGS. 18 to 20, which will be described later. For example, referring to FIG. 18, the one or more processors 102 may control the one or more transceivers 106 and/or one or more memories 104 to transmit the configuration information, and the one or more transceivers 106 may transmit the configuration information to the UE.

For example, the operation in which the UE (100/200 in FIG. 18) receives the configuration information from the BS (100/200 in FIGS. 18 to 20) in step M205 may be performed by the devices of FIGS. 18 to 20 to be described below. For example, referring to FIG. 18, the one or more processors 102 may control the one or more transceivers 106 and/or one or more memories 104 to receive the configuration information, and the one or more transceivers 106 may receive the configuration information from the BS.

The BS may transmit control information to the UE (M210). That is, the UE may receive the control information from the BS. For example, the control information may be transmitted/received in DCI. For example, the control information may include control information for transmission and reception of DL data/channels, scheduling information, resource allocation information, HARQ feedback related information (e.g., an NDI, an RV, the number of HARQ processes, a DAI, a TPC command for a scheduled PUCCH, a PUCCH resource indicator, a PDSCH-to-HARQ_feedback timing indicator, etc.). For example, the DCI may be one of DCI format 1_0 or DCI format 1_1.

For example, whether the HARQ feedback is enabled or disabled may be configured based on the DCI as described in the proposed methods (e.g., Proposal 1, Proposal 2, Proposal 3, Proposal 4, and Proposal 5). For example, whether the HARQ feedback is enabled or disabled may be configured based on the PDSCH-to-HARQ_feedback timing indicator field and/or PUCCH resource indicator field of the DCI. For example, the DCI may include an aggregation level (and/or repetition factor). For example, the number of HARQ processes may be set to 16 or more, and the 16 or more HARQ process IDs may be identified based on the HARQ process number field of the DCI and the index of a CCE/RB associated with the DCI.

For example, the operation in which the BS (100/200 in FIG. 18) transmits the control information to the UE (100/200 in FIGS. 18 to 20) in step M210 may be performed by the devices of FIGS. 18 to 20 to be described below. For example, referring to FIG. 18, the one or more processors 102 may control the one or more transceivers 106 and/or one or more memories 104 to transmit the control information, and the one or more transceivers 106 may transmit the control information to the UE.

For example, the operation in which the UE (100/200 in FIG. 18) receives the control information from the BS (100/200 in FIGS. 18 to 20) in step M210 may be performed by the devices of FIGS. 18 to 20 to be described below. For example, referring to FIG. 18, the one or more processors 102 may control the one or more transceivers 106 and/or one or more memories 104 to receive the control information, and the one or more transceivers 106 may receive the control information from the BS.

The BS may transmit DL data/channels (e.g., PDSCH) to the UE (M215). That is, the UE may receive the DL data/channels from the BS. For example, the DL data/channels may be transmitted/received based on the aforementioned configuration information/control information. For example, the DL data/channels may be repeatedly transmitted/received (e.g., based on slot aggregation).

For example, the operation in which the BS (100/200 in FIG. 18) transmits the DL data/channels to the UE (100/200 in FIGS. 18 to 20) in step M215 may be performed by the devices shown in FIGS. 18 to 20 to be described below. For example, referring to FIG. 18, the one or more processors 102 may control the one or more transceivers 106 and/or one or more memories 104 to transmit the DL data/channels, and the one or more transceivers 106 may transmit the DL data/channels to the UE.

For example, the operation in which the UE (100/200 in FIG. 18) receives the DL data/channels from the BS (100/200 in FIGS. 18 to 20) in step M115 may be performed by the devices shown in FIGS. 18 to 20 to be described below. For example, referring to FIG. 18, the one or more processors 102 may control the one or more transceivers 106 and/or one or more memories 104 to receive the DL data/channels, and the one or more transceivers 106 may receive the DL data/channels from the BS.

The BS may receive HARQ-ACK feedback from the UE (M220). That is, the UE may transmit the HARQ-ACK feedback to the BS. For example, the HARQ-ACK feedback may be enabled/disabled according to the proposed methods (e.g., Proposal 1, Proposal 2, Proposal 3, Proposal 4, and Proposal 5). For example, when the HARQ-ACK feedback is enabled, the HARQ-ACK feedback may be transmitted/received according to the proposed methods (e.g., Proposal 1, Proposal 2, Proposal 3, Proposal 4, and Proposal 5). For example, the HARQ-ACK feedback may include ACK/NACK information for DL data/channels transmitted from the BS. For example, the HARQ-ACK feedback may be transmitted on a PUCCH and/or PUSCH. For example, a HARQ-ACK codebook (e.g., Type 1/2/3) may be configured according to Proposal 2 described above. For example, a timing for transmitting the HARQ-ACK feedback may be determined according to Proposal 4 described above.

For example, the operation in which the BS (100/200 in FIG. 18) receives the HARQ-ACK feedback from the UE (100/200 in FIGS. 18 to 20) in step M220 may be performed by the devices shown in FIGS. 18 to 20 to be described below. For example, referring to FIG. 18, the one or more processors 102 may control the one or more transceivers 106 and/or one or more memories 104 to receive the HARQ-ACK feedback, and the one or more transceivers 106 may receive the HARQ-ACK feedback from the UE.

Figure 18:
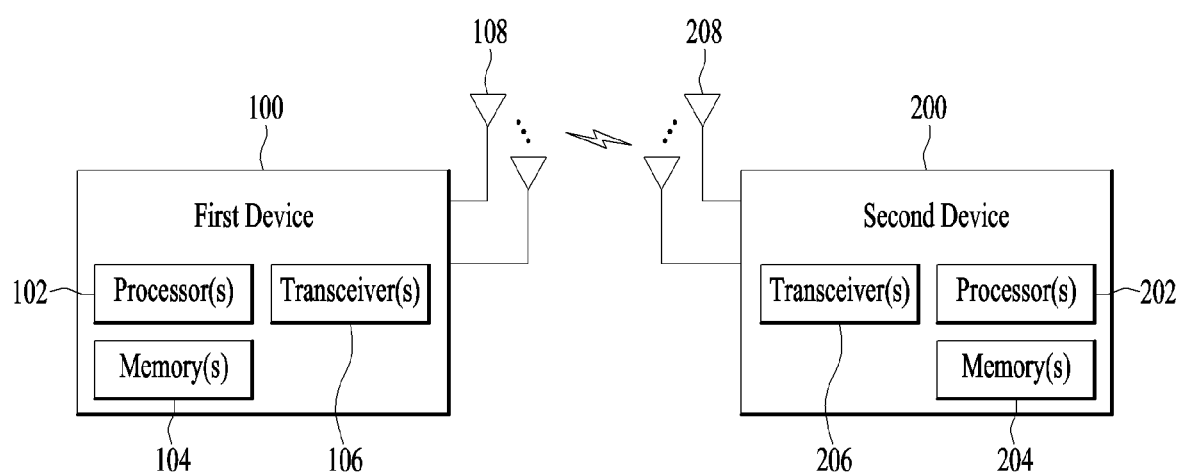
FIG. 18 illustrates wireless devices applicable to the present disclosure.
Figure 19:
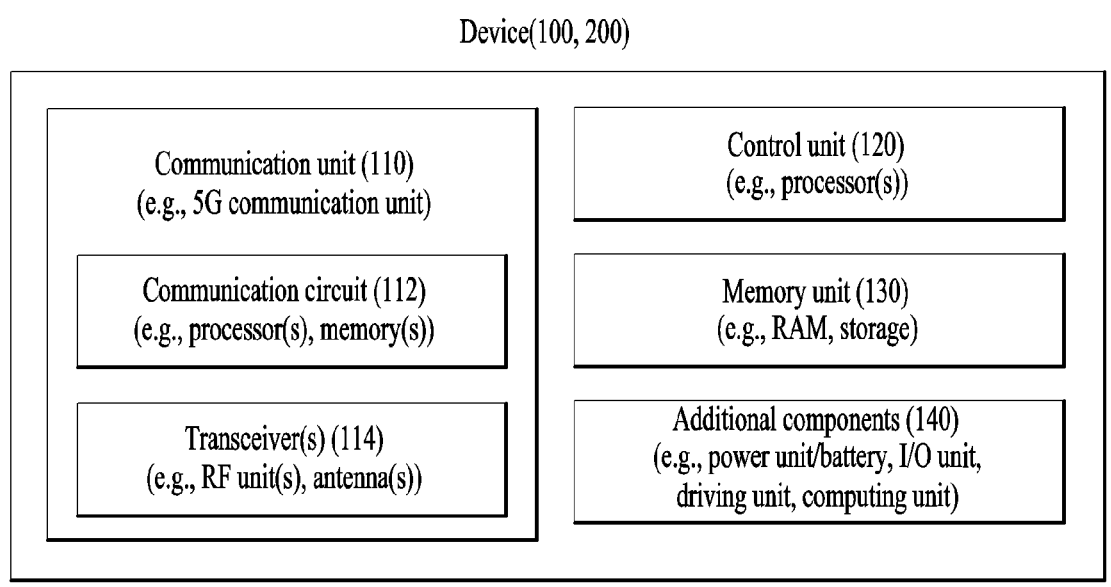
FIG. 19 illustrates another example of a wireless device to which the present disclosure is applied.
Figure 20:
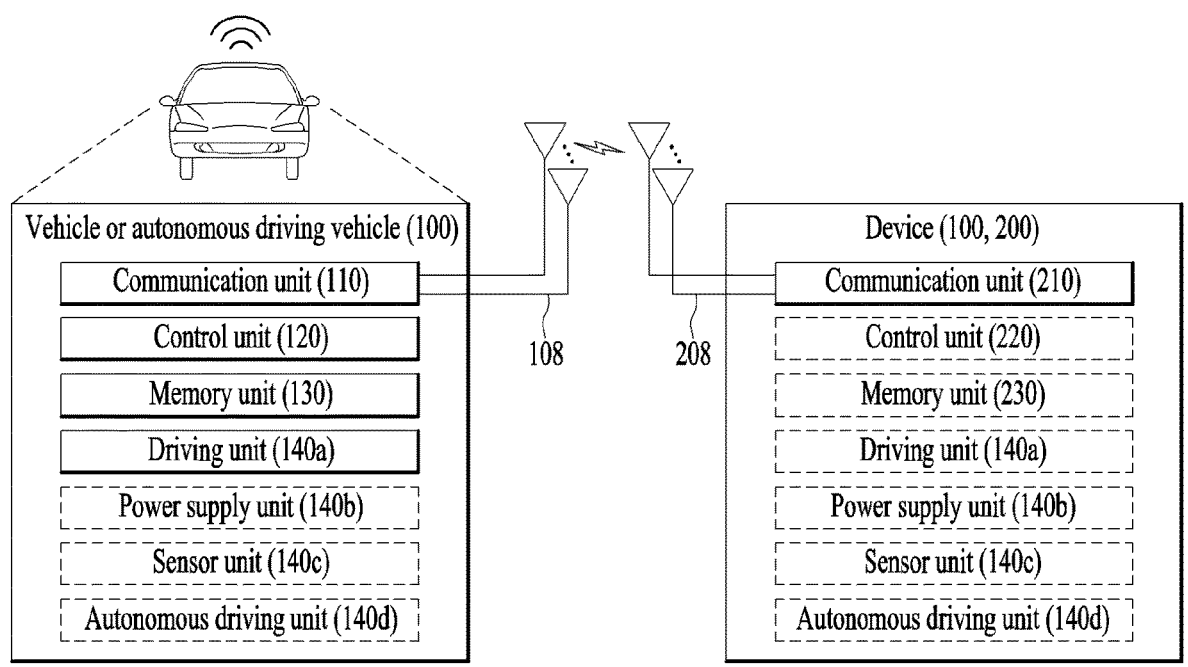
FIG. 20 illustrates a vehicle or an autonomous driving vehicle applied to the present disclosure.

For example, the operation in which the UE (100/200 in FIG. 18) transmits the HARQ-ACK feedback to the BS (100/200 in FIGS. 18 to 20) in step M220 may be performed by the devices shown in FIGS. 18 to 20. For example, referring to FIG. 18, the one or more processors 102 may control the one or more transceivers 106 and/or one or more memories 104 to transmit the HARQ-ACK feedback, and the one or more transceivers 106 may transmit the HARQ-ACK feedback to the BS.

The above-described operation and signaling performed by the BS/UE may be performed by the devices of FIGS. 18 and 20, which will be described later. For example, the BS may correspond to a first wireless device, and the UE may correspond to a second radio device. In addition, vice versa may be considered in some cases.

For example, the above-described operation and signaling performed by the BS/UE may be processed by one or more processors 102 and 202 of FIGS. 18 to 20, and the above-described operation and signaling performed by the BS/UE may be stored in a memory (e.g., one or more memories 104 and 204 of FIG. 18) in the form of an instruction/program (e.g., executable code) for driving at least one processor (e.g., processors 102 and 202) of FIGS. 18 to 20.

It is obvious that each of the examples of the proposed methods may also be included as one implementation method, and thus each of the examples may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from the BS to the UE in a predefined signal (e.g., a physical layer signal, a higher layer signal, etc.). Higher layers may include, for example, at least one of the following functional layers: MAC, RLC, PDCP, RRC, and SDAP.

Methods, embodiments, or details for implementing the methods proposed in this specification (e.g., Proposal 1, Proposal 2, Proposal 3, Proposal 4, and Proposal 5) may be applied independently. Alternatively, at least one of the methods (embodiments or details) may be applied in combination.

Hereinafter, a description will be given in more detail with reference to the drawings. In the following drawings/description, the same reference symbols may denote the same or corresponding hardware blocks, software blocks, or functional blocks unless described otherwise.

Figure 17:
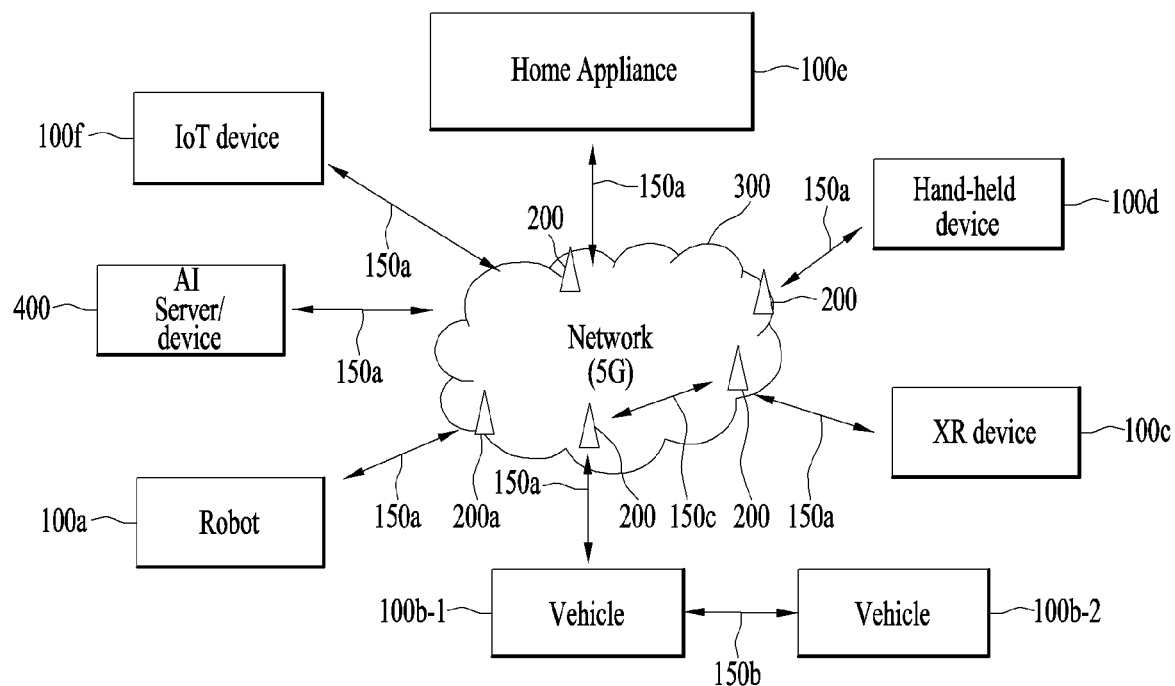
FIG. 17 illustrates a communication system applied to the present disclosure.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

FIG. 19 illustrates another example of a wireless device applied to the present disclosure. The wireless device may be implemented in various forms according to a use-case/service (refer to FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM), a flash memory, a volatile memory, a non-volatile memory, and/or a combination thereof.

The wireless communication technology implemented in the wireless devices 100 and 200 of the present specification may include narrowband Internet of Things (NB-IoT) for low-power communication as well as LTE, NR, and 6G. For example, NB-IoT technology may be an example of low power wide area network (LPWAN) and implemented by standards such as LTE Cat NB1 and/or LTE Cat NB2, not limited to the above-mentioned names. Additionally or alternatively, the wireless communication technology implemented in the wireless devices 100 and 200 of the present disclosure may perform communication based on LTE-M. For example, LTE-M may be an example of LPWAN and called by various names such as enhanced machine type communication (eMTC). For example, LTE-M may be implemented by at least one of various standards such as 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M, not limited to these names. Additionally or alternatively, the wireless communication technology implemented in the wireless devices 100 and 200 of the present disclosure may include at least one of ZigBee, Bluetooth, and low power wide area network (LPWAN) in consideration of low power communication, not limited to these names. For example, ZigBee may create a personal area network (PAN) related to small/low-power digital communication based on various standards such as IEEE 802.15.4, and may be called by various names.

FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 21:
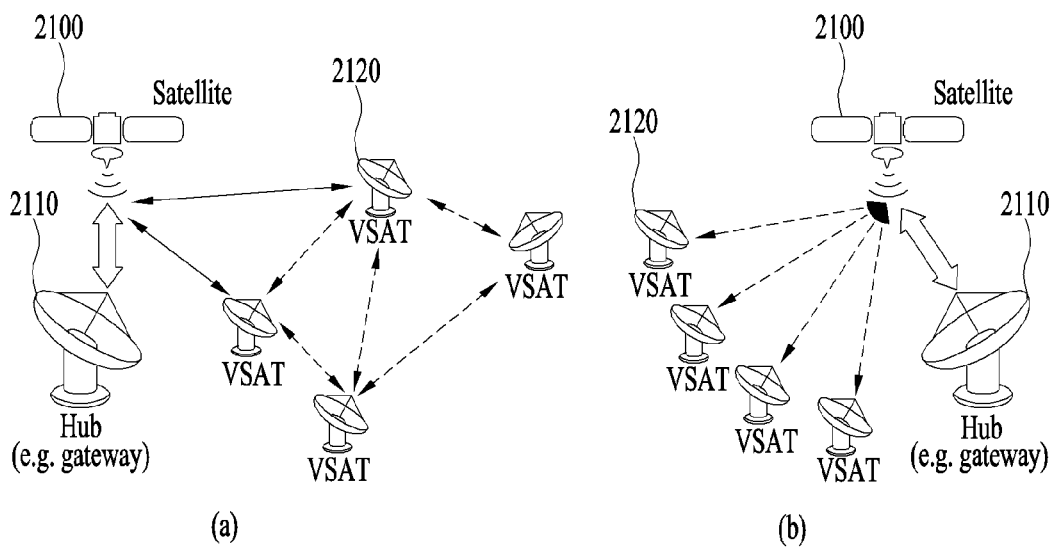
FIG. 21 illustrates a very-small-aperture terminal (VSAT) to which the present disclosure is applied.

FIG. 21 illustrates a very-small-aperture terminal (VSAT) to which the present disclosure is applied.

The VSAT 2120 may refer to an antenna/device capable of bidirectional communication with an antenna (plate) less than 3 meters. For example, the VSAT may be fixedly located on the ground or may be fixedly mounted on a vehicle, a marine vessel, and the like. For example, an NTN may be configured with the VSAT. Referring to FIG. 21, VSATs may be configured based on a mesh topology (FIG. 21(*a*)) or a start topology (FIG. 21(*b*)). For the mesh topology, each VSAT may be configured to directly communicate with other VSATs. For the start topology, multiple VSATs may be connected through a hub, and communication between VSATs may be performed through the hub. For example, the VSAT 2120 may serve as an NTN gateway/BS. For example, the VSAT 2120 may serve as an IAB node/BS on an IAB link, which will be described later. For example, an NTN gateway 420 may be connected to a satellite 2100, the satellite 2100 may be connected to the VSAT 2120, and the VSAT 2120 may be connected to a UE to provide services. In this case, the VSAT 2120 may communicate with the satellite 430 as an IAB mobile termination (IAB-MT) and provide services to the UE as an IAB distributed unit (DU). In addition, the satellite 2100 may operate as a parent node.

Figure 22:
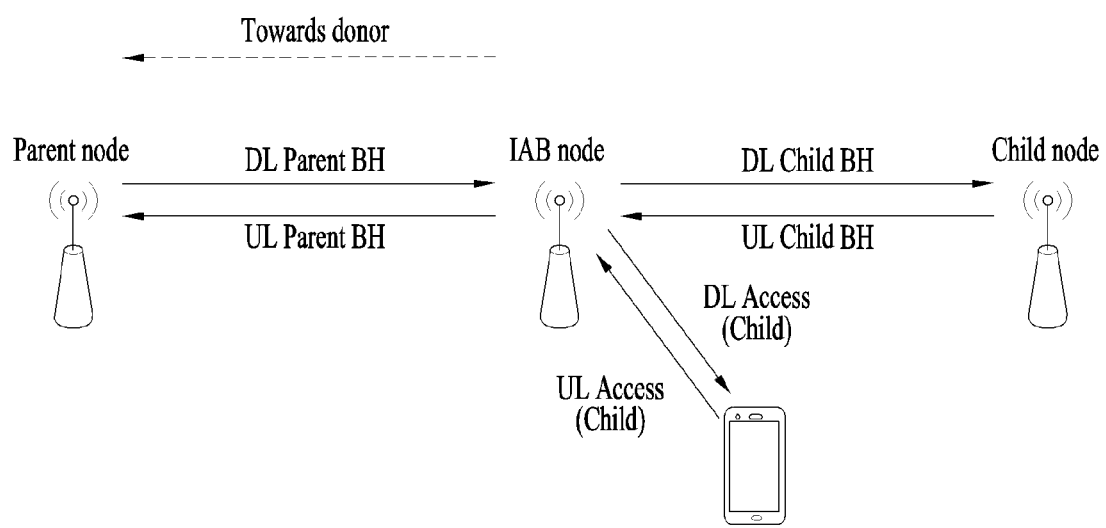
FIG. 22 illustrates an exemplary integrated access backhaul (IAB) to which the present disclosure is applied.

FIG. 22 illustrates an exemplary IAB to which the present disclosure is applied.

An IAB node (relay node) may multiplex access and backhaul links in the time, frequency and/or space (e.g., beam-based operation) domain. The IAB node means a RAN node that supports a radio access link for UEs and/or a radio backhaul link for parent and child nodes. From the perspective of the network, an IAB donor may be a terminating node of NR backhauling. That is, the IAB donor may provide the UE with an interface for accessing a core network. In addition, the IAB donor may be a RAN node that provides a wireless backhaul link to the IAB node. The parent node may be a next-hop neighbor node of an IAB node MT, and the parent node may be an IAB node or an IAB donor DU. The child node may be a next-hop neighbor node of an IAB node DU, and the child node may also correspond to an IAB node.

In IAB links, upstream refers to the direction of a parent node in the IAB topology, and downstream refers to the direction of a child node or UE of in the IAB topology. An access link refers to a link between an access UE and an IAB node or IAB donor, and a backhaul link refers to a link between an IAB node and an IAB child node or an IAB parent node. The access and backhaul links may operate at the same or different frequencies. The IAB may reuse functions and interfaces defined for conventional access (for in-band and out-of-band relays). For example, a NR Uu interface may be used for the access link, and the above-described F1 interface may be extended and applied to the backhaul link. For example, when the F1 interface is applied to the backhaul link, a gNB DU may be interpreted as an IAB node, and a gNB central unit (CU) may be interpreted as an IAB donor.

For example, in FIG. 6, a connection between the UE (BS) 430, the satellite 410, and the gateway 420 may be interpreted as an IAB link of FIG. 22. In the NTN, the satellite 410 may operate as an IAB node, and the NTN gateway 420 may operate as a parent node, an IAB donor, and/or a child node. Alternatively, the BS may operate as an IAB node, and the satellite 410 may operate as a parent node and/or a child node. Further, the satellite 410 may operate as an IAB node, and the BS may operate as a parent node and/or a child node.

For firmware or software implementation, an embodiment of the present disclosure may be implemented in the form of a module, a procedure, a function, and so on for performing the above-described functions or operations. Software code may be stored in a memory and executed by a processor. The memory is located at the interior or exterior of the processor and may transmit and receive data to and from the processor via various known means.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some of the elements and/or features. The order of operations described in the embodiments of the present disclosure may be rearranged. Several configurations or features of any one embodiment may be included in another embodiment or may be replaced with related configurations or features of another embodiment. It is obvious that claims that are not explicitly cited in the appended claims may be combined to form an embodiment or included as a new claim by amendment after filing.

Various embodiments of the present disclosure may be carried out in other specific ways than those set forth herein without departing from the essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a user equipment (UE), a base station (BS), or other devices in wireless mobile communication systems.

What is claimed is:

1. A method performed by a user equipment (UE) in a wireless communication system, the method comprising:
    receiving configured information for disabling hybrid automatic repeat request (HARQ) feedback for at least one of HARQ process identifier (ID) among a plurality of HARQ process IDs;
    receiving a PDCCH (Physical Downlink Control Channel) including downlink control information (DCI);
    receiving a PDSCH (Physical Downlink Shared Channel) based on the DCI;
    determining a HARQ-acknowledgement (HARQ-ACK) codebook for the PDSCH based on the configuration information,
    wherein the HARQ-ACK codebook is determined only for first HARQ process IDs enabled based on the configuration information among the plurality of HARQ process IDs; and
    transmitting HARQ-ACK information based on the HARQ-ACK codebook,
    wherein a transmission timing of the HARQ-ACK information is determined based on a time resource at which the PDSCH was received and a K1 value, and
    wherein the UE determines the K1 value based on bits obtained by adding one bit to bits of a PDSCH-to-HARQ feedback timing indicator field included in the DCI, and
    wherein a value of the one bit is determined based on the lowest CCE (Control Channel Element) index among CCE indices for the PDCCH.

2. The method of claim 1,
    wherein the first HARQ process IDs with the enabled HARQ feedback comprise remaining HARQ process IDs except for the at least one HARQ process ID with the disabled HARQ feedback among the plurality of HARQ process IDs.

3. The method of claim 1,
    wherein the plurality of HARQ process IDs are configured for each of a plurality of cells configured for the UE, and
    wherein the HARQ-ACK codebook is determined based on a cell including the first HARQ process ID with the enabled HARQ feedback.

4. The method of claim 1,
    wherein the UE is configured to ignore a counter downlink assignment indicator (C-DAI) value of the DCI indicating the at least one HARQ process with the disabled HARQ feedback.

5. The method of claim 1,
    wherein the HARQ-ACK codebook comprises a Type 1 HARQ-ACK codebook, a Type 2 HARQ-ACK codebook, or a Type 3 HARQ-ACK codebook.

6. The method of claim 1,
    wherein the wireless communication system comprises a non-terrestrial network (NTN).

7. A user equipment (UE) configured to operate in a wireless communication system, the UE comprising:
    at least one radio frequency (RF) unit;
    at least one processor; and
    at least one memory operatively connected to the at least one processor and configured to store at least one instruction for allowing the at least one processor to perform operations,
    wherein the operations include:
    receiving configuration information for disabling hybrid automatic repeat request (HARQ) feedback for at least one of HARQ process identifier (ID) among a plurality of HARQ process IDs;
    receiving a PDCCH (Physical Downlink Control Channel) including downlink control information (DCI);
    receiving a PDSCH (Physical Downlink Shared Channel) based on the DCI;
    determining a HARQ-acknowledgement (HARQ-ACK) codebook for the PDSCH based on the configuration information,
    wherein the HARQ-ACK codebook is determined only for first HARQ process IDs enabled based on the configuration information among the plurality of HARQ process IDs; and
    transmitting HARQ-ACK information based on the HARQ-ACK codebook,
    wherein a transmission timing of the HARQ-ACK information is determined based on a time resource at which the PDSCH was received and a K1 value, and
    wherein the K1 value is determined based on bits obtained by adding one bit to bits of a PDSCH-to-HARQ feedback timing indicator field included in the DCI, and
    wherein a value of the one bit is determined based on the lowest CCE (Control Channel Element) index among CCE indices for the PDCCH.

* * * * *